(12) United States Patent
Jagannathan et al.

(10) Patent No.: US 10,198,702 B2
(45) Date of Patent: Feb. 5, 2019

(54) END-TO END PROJECT MANAGEMENT

(71) Applicant: Accenture Global Services Limited, Dublin (IE)

(72) Inventors: Purnima Jagannathan, Chennai (IN); Vijayaraghavan Koushik, Chennai (IN); Rajendra T. Prasad, Bangalore (IN); Suparna Moitra, Bangalore (IN); Pankaj Jetley, Pune (IN); Gayathri Pallail, Bangalore (IN); Jenice J. Mukkada, Bangalore (IN); Roopalaxmi Manjunath, Bangalore (IN); Rajilakshmi Krishna, Bangalore (IN); Bhaskar Ghosh, Bangalore (IN); Shankarnarayanan Sethuraman, Mumbai (IN); Chaitra Hebbal, Bangalore (IN); Sandeep J. Rathod, Mumbai (IN); Kanthy Prasad Kalepu, Hyderabad (IN); Andrew J. Cook, Bristol (GB); Muthuvel Nagalingam, Bangalore (IN)

(73) Assignee: Acccenture Global Services Limited, Dublin (IE)

( * ) Notice: Subject to any disclaimer, the term of this patent is extended or adjusted under 35 U.S.C. 154(b) by 53 days.

(21) Appl. No.: 14/610,284

(22) Filed: Jan. 30, 2015

(65) Prior Publication Data
US 2016/0224908 A1    Aug. 4, 2016

(51) Int. Cl.
G06Q 10/06        (2012.01)
(52) U.S. Cl.
CPC ................... G06Q 10/063 (2013.01)

(58) Field of Classification Search
CPC .................................................. G06Q 10/063
See application file for complete search history.

(56) References Cited

U.S. PATENT DOCUMENTS

| 5,767,848 A * | 6/1998 | Matsuzaki | G06Q 10/10 715/705 |
| 7,051,036 B2 * | 5/2006 | Rosnow | G06Q 10/06 707/723 |

(Continued)

OTHER PUBLICATIONS

Chatfield et al., Microsoft Project 2013 Step by Step, 2013, Microsoft Press.*

(Continued)

Primary Examiner — Chat C Do
Assistant Examiner — Douglas M Slachta
(74) Attorney, Agent, or Firm — Harrity & Harrity, LLP

(57) ABSTRACT

A device may provide a user interface for receiving project information for a software implementation project. The project information may be associated with a set of requirements defining the software implementation project. The project information may be associated with a set of deliverables describing results of the software implementation project. The device may generate an initial project plan based on the project information. The device may receive information regarding the initial project plan during fulfillment of the project plan. The device may selectively provide an alert associated with the initial project plan based on receiving the information regarding the initial project plan. The device may selectively generate a modified project plan based on receiving the information regarding the project plan.

20 Claims, 18 Drawing Sheets

(56) References Cited

U.S. PATENT DOCUMENTS

| | | | |
|---|---|---|---|
| 7,062,449 B1* | 6/2006 | Clark | G06Q 10/06 705/7.15 |
| 7,069,229 B1* | 6/2006 | Richardson | G06Q 10/0631 14 705/7.15 |
| 7,337,124 B2* | 2/2008 | Corral | G06Q 10/06 705/7.17 |
| 7,440,905 B2* | 10/2008 | Ellis | G06Q 10/0631 2 705/7.22 |
| 7,624,024 B2* | 11/2009 | Levis | G06Q 10/08 705/1.1 |
| 8,006,222 B2* | 8/2011 | Ruhe | G06Q 10/10 705/12 |
| 8,006,223 B2 | 8/2011 | Boulineau et al. | |
| 8,225,270 B2* | 7/2012 | Frasher | G06F 11/3616 705/7.16 |
| 8,533,658 B2* | 9/2013 | Patten | G09B 7/02 703/16 |
| 8,543,438 B1* | 9/2013 | Fleiss | G06Q 10/0631 705/7.11 |
| 8,635,056 B2 | 1/2014 | Bassin et al. | |
| 8,843,878 B1* | 9/2014 | Grundner | G06Q 10/0631 717/101 |
| 9,418,348 B2* | 8/2016 | De | G06Q 10/06 |
| 2004/0143477 A1* | 7/2004 | Wolff | G06Q 10/0631 6 705/7.26 |
| 2005/0091098 A1* | 4/2005 | Brodersen | G06Q 10/06 705/500 |
| 2005/0114829 A1* | 5/2005 | Robin | G06Q 10/06 717/101 |
| 2005/0125274 A1* | 6/2005 | Nastacio | G06Q 10/0631 12 705/26.1 |
| 2005/0159994 A1* | 7/2005 | Huddleston | G06Q 10/04 705/7.36 |
| 2006/0190391 A1* | 8/2006 | Cullen, III | G06Q 10/10 705/37 |
| 2007/0244591 A1* | 10/2007 | Ishibashi | G06Q 10/04 700/99 |
| 2008/0082389 A1* | 4/2008 | Gura | G06Q 10/0631 1 705/7.13 |
| 2008/0229313 A1* | 9/2008 | Motoyama | G06F 9/54 718/102 |
| 2008/0243575 A1* | 10/2008 | Weinberger | G06Q 10/06 705/7.13 |
| 2008/0313596 A1* | 12/2008 | Kreamer | G06F 8/20 717/101 |
| 2009/0006164 A1* | 1/2009 | Kaiser | G06Q 10/06 705/7.14 |
| 2009/0037869 A1* | 2/2009 | Hamilton | G06Q 10/00 717/100 |
| 2009/0070767 A1* | 3/2009 | Garbow | G06F 9/5066 718/104 |
| 2009/0132318 A1* | 5/2009 | Jin | G06Q 10/06 705/7.12 |
| 2009/0177447 A1* | 7/2009 | Hsu | G06F 11/3616 703/2 |
| 2009/0192836 A1* | 7/2009 | Kelly | G06Q 10/06 705/7.32 |
| 2009/0216602 A1* | 8/2009 | Henderson | G06Q 10/00 705/7.41 |
| 2009/0259985 A1* | 10/2009 | Knutson | G06F 8/10 717/101 |
| 2010/0162200 A1* | 6/2010 | Kamiyama | G06Q 10/06 717/101 |
| 2010/0162215 A1* | 6/2010 | Purcell | G06F 8/77 717/127 |
| 2011/0184771 A1* | 7/2011 | Wells | G06Q 10/04 705/7.14 |
| 2012/0226519 A1* | 9/2012 | Copeland | G06Q 10/0635 705/7.28 |
| 2012/0259540 A1* | 10/2012 | Kishore | G06Q 10/06 701/410 |
| 2012/0284073 A1* | 11/2012 | Agarwal | G06Q 10/101 705/7.13 |
| 2013/0218620 A1* | 8/2013 | Liu | G06Q 10/06 705/7.14 |
| 2013/0231971 A1* | 9/2013 | Bishop | G06Q 10/0631 14 705/7.15 |
| 2013/0268913 A1* | 10/2013 | Anderson | G06F 8/70 717/120 |
| 2014/0025413 A1* | 1/2014 | Yeager | G06Q 10/0631 705/7.12 |
| 2014/0039954 A1* | 2/2014 | Wong | G06Q 10/0631 18 705/7.14 |
| 2014/0114714 A1* | 4/2014 | Podgurny | G06Q 10/06 705/7.14 |
| 2014/0122143 A1* | 5/2014 | Fletcher | G06Q 10/0631 12 705/7.14 |
| 2014/0142998 A1* | 5/2014 | Kroeger | G06Q 10/0631 1 705/7.13 |
| 2015/0006214 A1* | 1/2015 | Lavoie | G06Q 10/0631 18 705/7.17 |
| 2015/0006234 A1* | 1/2015 | Boyette | G06Q 10/0631 6 705/7.26 |
| 2015/0106145 A1* | 4/2015 | Hamilton | G06Q 10/0631 14 705/7.15 |

OTHER PUBLICATIONS

Pallail et al., "Rhythm of Requirements—Domino Effect on Software Engineering Lifecycle," the CMMI Institute, CMMI Conference 2014, May 2014, 8 pages.

Accenture, "Rhythm of Requirements," the CMMI Institute, CMMI Conference 2014, May 2014, 15 pages.

* cited by examiner

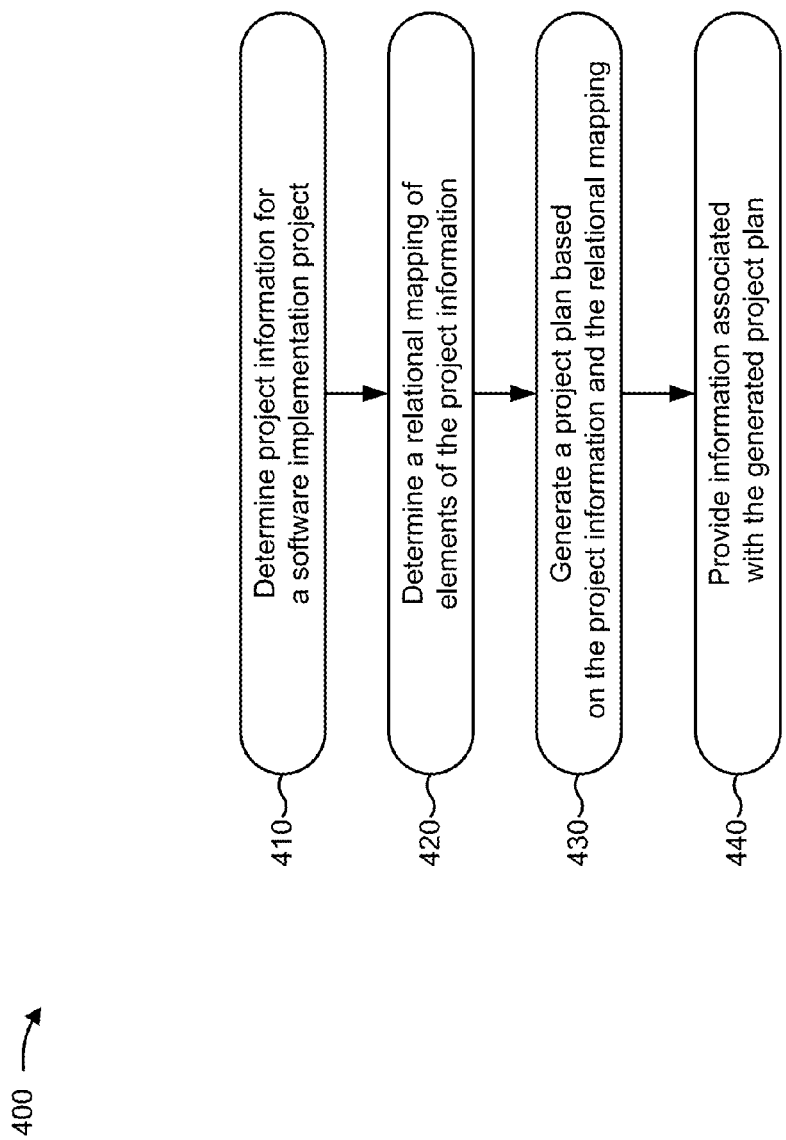

Project Wizard

| Task Name | Duration | Task Effort (hrs) | Requirements | Deliverables |
|---|---|---|---|---|
| ▣ Project | 25 | 500 | All | All |
|   ▣ Overall Planning | 5 | 120 | 1-62, 85-109, … | 1,3,4… |
|     Technology Stack | 3 | 22 | 1, 3, 5, 6, 7, … | 2,5,6… |
|     Data Model | 3 | 36 | … | 1,7,8… |
|     Onboarding | 4 | 40 | … | 3,4,5… |
|   ▣ Resource Onboarding | 3 | 20 | … | 5,8,9… |
|     Onboarding – John Smith | 2 | 8 | … | 6,9,12… |
|     Onboarding – Jane Doe | 3 | 8 | … | 4,7,8… |
|   ▣ Design | 7 | 150 | … | 4,6,15… |
|     Prepare | 6 | 40 | … | 2,8,26… |
|     Review | 5 | 60 | … | 8,10,12… |

. . .

520 — Save & Next

FIG. 5D

END-TO END PROJECT MANAGEMENT

BACKGROUND

A software implementation project may be described by a set of requirements that set forth functional and non-functional aspects of the software implementation project. For example, a set of requirements may include a performance requirement, a quality requirement, a design requirement, a set of use cases to be handled, or the like. Requirements may be gathered in a single document or as part of a continuing process during development of the software implementation project. Change requirements may indicate changes to one or more requirements of the software implementation project, and may be received during development of the software implementation project.

SUMMARY

According to some possible implementations, a device may provide a user interface for receiving project information for a software implementation project. The project information may be associated with a set of requirements defining the software implementation project. The project information may be associated with a set of deliverables describing results of the software implementation project. The device may generate an initial project plan based on the project information. The device may receive information regarding the initial project plan during fulfillment of the project plan. The device may selectively provide an alert associated with the initial project plan based on receiving the information regarding the initial project plan. The device may selectively generate a modified project plan based on receiving the information regarding the project plan.

According to some possible implementations, a computer readable medium may store instructions, that when executed by a processor, cause the processor to receive project information regarding one or more requirements for a software implementation project. The instructions may cause the processor to determine a set of tasks associated with a respective set of task complexities. The set of tasks may be associated with producing a set of deliverables based on the set of requirements. The instructions may cause the processor to determine a project schedule based on the set of tasks and the respective task complexities. The project schedule including respective time-frames for the set of tasks. The instructions may cause the processor to provide information identifying the project schedule for the software implementation project.

According to some possible implementations, a method may include determining, by a device, project information associated with a software implementation project. The method may include determining, by the device, a set of project plans for the software implementation project based on the project information. The method may include determining, by the device, a projected requirements velocity and a projected requirements volatility based on the project information and other project information associated with one or more other software implementation projects. The requirements velocity may represent a timing of requirements inflow. The requirements volatility may represent a rate of change of requirements associated with receiving one or more change requirements. The method may include selecting, by the device, a project plan, of the set of project plans, based on a set of project criteria. The project plan may include a project schedule for a set of project tasks. The set of project tasks may represent work product for producing a set of deliverables associated with the software implementation project. The method may include providing, by the device, information associated with the project plan. The method may include providing, by the device, one or more alerts associated with the project plan based on the projected requirements velocity and the projected requirements volatility.

BRIEF DESCRIPTION OF THE DRAWINGS

FIG. 4 is a flow chart of an example process for generating an initial project plan for a software implementation project;

FIGS. 5A-5E are diagrams of an example implementation relating to the example process shown in FIG. 4;

DETAILED DESCRIPTION

The following detailed description of example implementations refers to the accompanying drawings. The same reference numbers in different drawings may identify the same or similar elements.

A user may manage a software implementation project that includes a set of requirements (e.g., information describing the software implementation project) and a set of deliverables (e.g., produced results of the software implementation project). The user may generate a set of tasks for a set of developers so that the developers generate the set of deliverables based on the set of requirements. The user may modify a particular task of the set of tasks based on progress of development, based on receiving a change requirement (e.g., a modification of the software implementation project) from a client, or the like. However, the user may lack sufficient information to plan the software implementation project due to project complexity, developer availability, and uncertainty regarding timing of incoming requirements and change requirements. Implementations, described herein, may facilitate end-to-end project management based on analyzing velocity and volatility of requirements for a software implementation project, monitoring progress of the software implementation project, and alerting a user to suggested alterations to the software implementation project.

Figure 1:
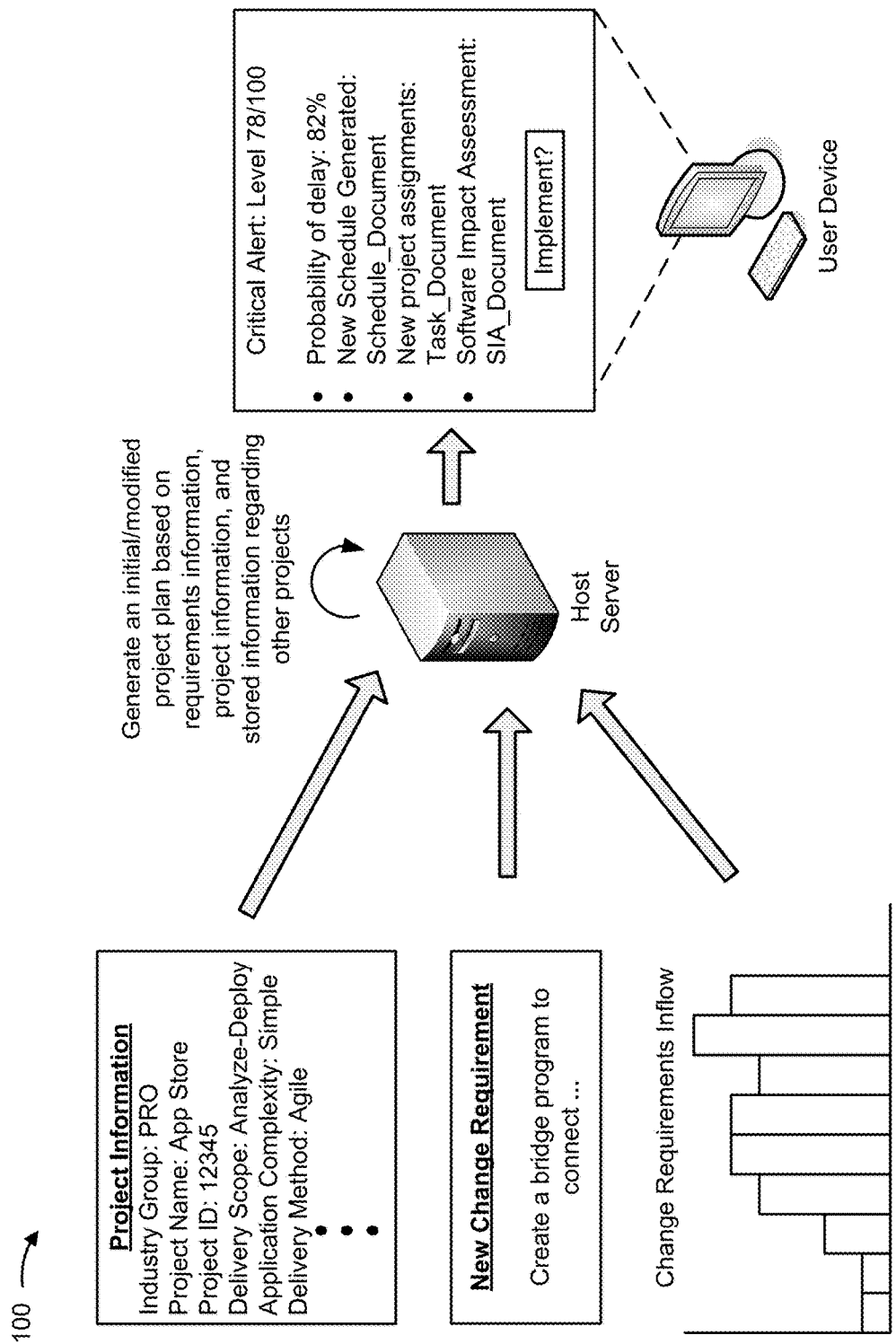
FIG. 1 is a diagram of an overview of an example implementation described herein.

FIG. 1 is a diagram of an overview of an example implementation 100 described herein. As shown in FIG. 1, a host server may perform project management, including generating an initial project plan, providing alerts based on monitoring the initial project plan, generating a modified project plan based on receiving change requirements, and assigning developers to complete tasks associated with the project plan. For example, the host server receive project information describing a software implementation project. The project information may include information identifying the software implementation project, information describing a complexity of the software implementation project, or the like. The host server may monitor a requirements inflow. Requirements inflow may refer to information associated with receiving one or more requirements (e.g., a timing of receiving one or more requirements, a rate at which one or more requirements are received, or the like) from a client for which the software implementation project is being completed. The host server may monitor a change requirements inflow. A change requirements inflow may refer to information associated with receiving one or more change requirements (e.g., a timing of receiving one or more change requirements, a rate at which one or more change requirements are received, or the like) that indicate respective changes to the software implementation project. The host server may determine a projected velocity (e.g., a rate at which requirements are being received) and a projected volatility (e.g., a rate of change of requirements) based on the requirements inflow and the change requirements inflow.

As further shown in FIG. 1, the host server may generate a new and/or a modified project plan based on the received information. For example, the host server may generate an initial project plan for a software implementation project based on project information, based on receiving information from a user utilizing the host server, based on information associated with other software implementation projects, or the like. Additionally, or alternatively, when a change requirement is received, the host server may generate a modified project plan based on requirements information (e.g., the requirements velocity, the requirements volatility, or the like), the project information, stored information regarding other software implementation projects that have already been completed successfully, or the like. For example, the host server may determine a set of project analytics (e.g., one or more metrics associated with scheduling, cost, risk of delay, defect detection, or the like), and may generate a project plan that accounts for the project analytics. A project plan may include information associated with requirements traceability (e.g., information indicating requirements affected by change requirements, deliverables corresponding to requirements, or the like), a set of tasks for a set of developers (i.e., a set of users associated with performing tasks to complete the software implementation project), a set of project milestones, or the like. The set of tasks for the set of developers may be assigned based on a developer assignment process that accounts for developer skill, task complexity, and schedule flexibility. Host server may provide alerts based on monitoring the project plan that indicate whether the project plan is on schedule, whether the project plan is on budget, or the like.

As further shown in FIG. 1, the host server may provide information associated with a project plan, such as an alert, a schedule, information identifying the one or more project metrics, or the like, to a user associated with managing the software implementation project. The host server may implement the project plan based on receiving confirmation from the user. In some implementations, the host server may provide a set of project plans for selection, and may implement a particular project plan, of the set of project plans, based on receiving a user selection, based on a set of selection criteria, or the like. In this way, a host server may facilitate end-to-end project management for software implementation projects, thereby improving the technical field of software implementation. Furthermore, the host server may determine an impact of a change to a project metric, a new requirement, a new change requirement, or the like, may generate an alert, a modified project plan, or the like based on the impact, and may provide the alert, the modified project plan, and/or information associated therewith. In this way, the host server may facilitate ongoing management of the software implementation project, resulting in a reduction in the amount of processing resources necessary to complete the software implementation project.

Figure 2:
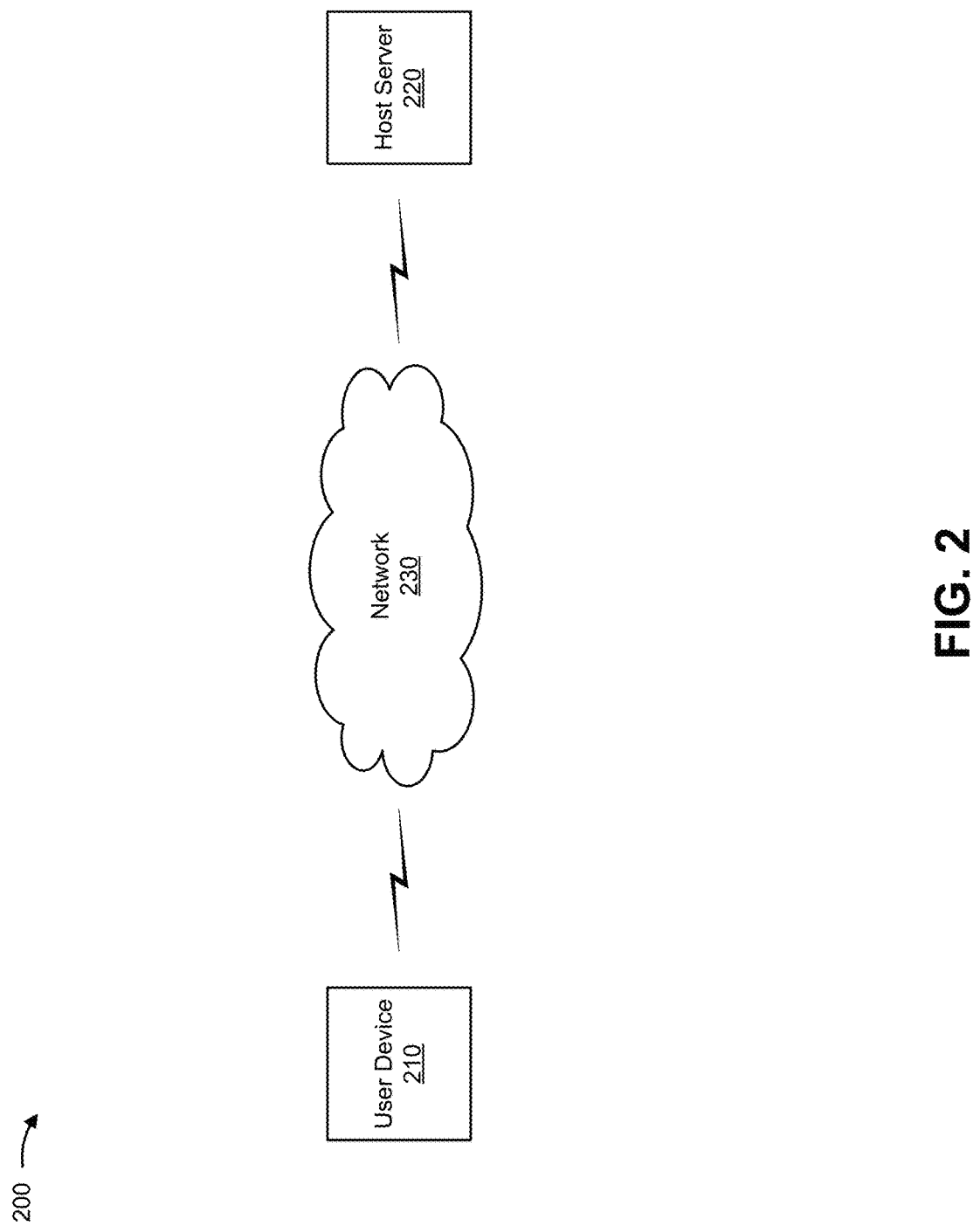
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, a host server 220, and/or network 230. Devices of environment 200 may interconnect via wired connections, wireless connections, or a combination of wired and wireless connections.

User device 210 may include one or more devices capable of receiving, generating, storing, processing, and/or providing information associated with a software implementation project. For example, user device 210 may include a device, such as a mobile phone (e.g., a smart phone, a radiotelephone, etc.), a desktop computer, a laptop computer, a tablet computer, a handheld computer, or a similar type of device. In some implementations, user device 210 may provide a user interface for receiving project information, a selection of a project plan, or the like. In some implementations, user device 210 may receive information from and/or transmit information to another device in environment 200.

Host server 220 may include one or more devices capable of storing, processing, and/or routing information associated with a software implementation project. In some implementations, host server 220 may receive requirements information (e.g., a set of requirements, a set of change requirements, or the like), and may process the requirements information to predict other requirements information (e.g., a schedule for receiving one or more other requirements, a schedule for receiving one or more other change requirements, or the like). In some implementations, host server 220 may include a communication interface that allows host server 220 to receive information from and/or transmit information to other devices in environment 200.

Network 230 may include one or more wired and/or wireless networks. For example, network 230 may include a cellular network (e.g., an LTE network, a 3G network, a code division multiple access (CDMA) network, etc.), a public land mobile network (PLMN), a local area network (LAN), a wide area network (WAN), a metropolitan area network (MAN), an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
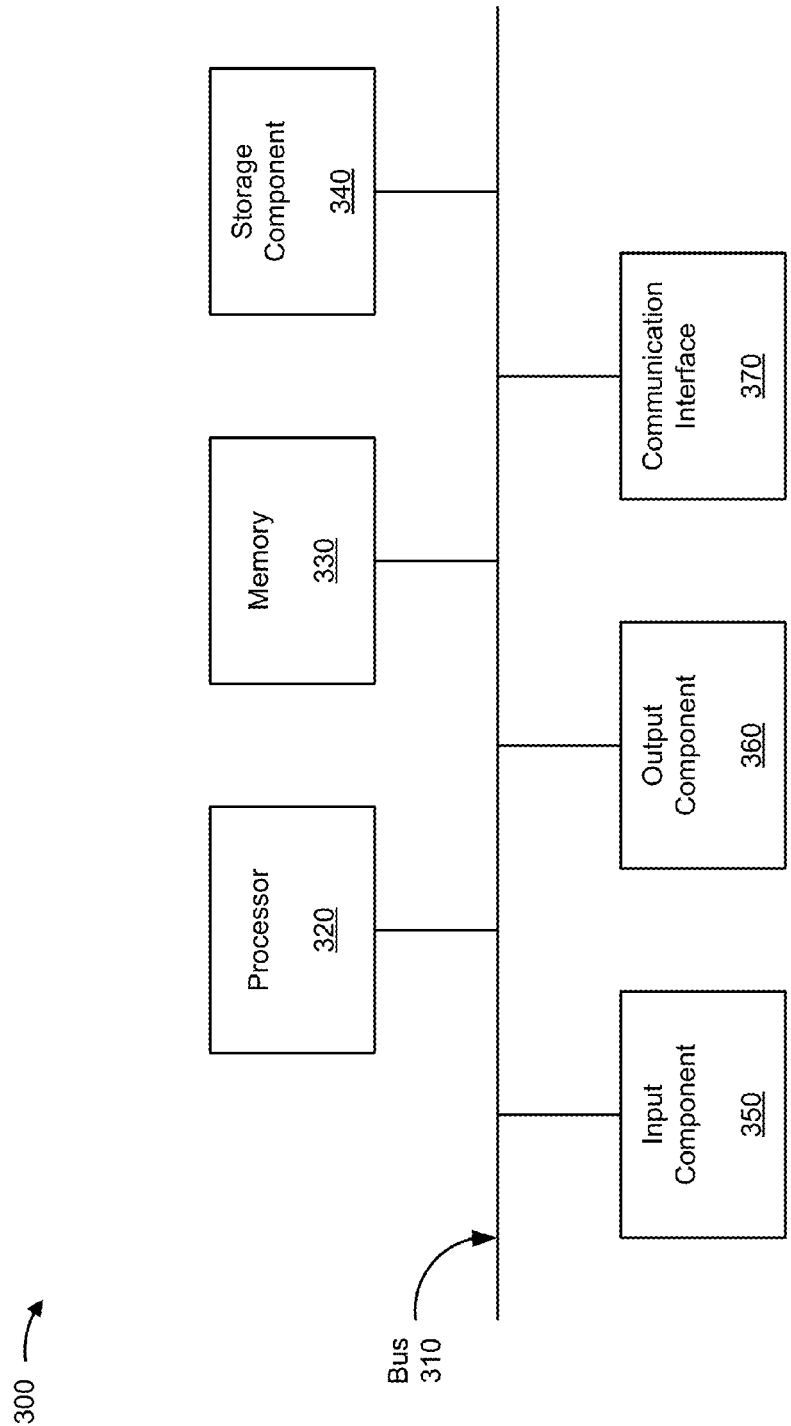
FIG. 3 is a diagram of example components of one or more devices of FIG. 2.

FIG. 3 is a diagram of example components of a device 300. Device 300 may correspond to user device 210 and/or host server 220. In some implementations, user device 210 and/or host server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating an initial project plan for a software implementation project. In some implementations, one or more process blocks of FIG. 4 may be performed by host device 220. In some implementations, one or more process blocks of FIG. 4 may be performed by another device or a group of devices separate from or including host server 220, such as user device 210, or the like.

As shown in FIG. 4, process 400 may include determining project information for a software implementation project (block 410). For example, host server 220 may determine project information associated with a software implementation project. A software implementation project may refer to a project for developing, designing, and/or re-configuring software. In some implementations, host server 220 may receive the project information associated with the software implementation project. For example, a user of user device 210 may provide, via a user interface associated with user device 210, information describing the software implementation project (e.g., a project scope, a project delivery method, a project complexity, or the like), and host server 220 may receive the project information from user device 210. In some implementations, host server 220 may receive user estimations, such as a user estimation regarding project complexity, a user estimation regarding a quantity of time that a task will require, or the like, and host server 220 may refine the user estimations based on other project information associated with other software implementation projects, based on a set of templates associated with generating project plans, based on information received during fulfillment of the software implementation project, or the like.

Additionally, or alternatively, host server 220 may generate some of the project information associated with the software development project. For example, host server 220 may compare the software implementation project to a set of other software implementation projects (e.g., stored via a data structure) that have been successfully completed, and may generate some of the project information based on other project information associated with the set of other software implementation projects. In this way, host server 220 may facilitate creation of project information for a software implementation project by a user without familiarity with software implementation project creation.

Additionally, or alternatively, host server 220 may determine the project information based on a type of software implementation project. For example, host server 220 may receive information indicating that the software implementation project relates to a type of software (e.g., financial software, project management software, software for developing a mobile application, software for managing a fleet of drones, software for predicting sports statistics, or the like) and may generate project information based on other project information relating to other software implementation projects of the same type. As another example, when host server 220 receives an indication that the software implementation project relates to financial software, host server 220 may determine that the software implementation project is to be associated with a particular schedule template, a particular cost template, a particular quality template, or the like.

As further shown in FIG. 4, process 400 may include determining a relational mapping of elements of the project information (block 420). For example, host server 220 may determine a set of associations between a set of requirements and a set of deliverables. In some implementations, host server 220 may generate a particular set of deliverables corresponding to one or more requirements based on other project information. For example, when a particular requirement describes a user login screen for the software implementation project associated with ".Net" technology and custom development methodology, host server 220 may include deliverables such as a login screen user interface in HTML, a web service middle tier, and a stored procedure to retrieve data from a data structure.

Additionally, or alternatively, host server 220 may request and receive a set of associations between aspects of the software implementation project (e.g., one or more requirements, one or more deliverables, one or more tasks, or the like) from user device 210. In some implementations, host server 220 may provide traceability information (e.g., information identifying deliverables associated with requirements, or the like) based on determining the relational mapping. In this way, host server 220 may facilitate project management of defects detected in deliverables, change requirements inflow, or the like.

In some implementations, host server 220 may score an aspect of the software implementation project based on a criticality determination. For example, host server 220 may determine that a first deliverable is associated with a set of other deliverables, and may determine that the first deliverable has a particular level of criticality. Additionally, or alternatively, host server 220 may determine that a second deliverable is independent of other deliverables of the software implementation project, and may determine that the second deliverable has a lesser level of criticality than that of the first deliverable. In this way, host server 220 may identify elements of the software implementation project that are to be prioritized during generation of a schedule for the software implementation project.

As further shown in FIG. 4, process 400 may include generating a project plan based on project information and the relational mapping (block 430). For example, host server 220 may generate the project plans based on the project information and the relational mapping. In some implementations, host server 220 may suggest multiple potential project plans for user selection. In some implementations, host server 220 may generate a set of tasks for a particular project plan. For example, host server 220 may generate a task list for developing the set of deliverables. Additionally, or alternatively, host server 220 may assign one or more tasks of the task list to one or more developers. For example, host server 220 may determine a development capability of a developer (e.g., a skill profile for the developer, an availability of the developer, or the like), and may assign a set of tasks to the developer based on the development capability of the developer as described herein with regard to FIG. 10. In some implementations, host server 220 may generate a project schedule for the particular project plan. For example, host server 220 may determine a quantity of time associated with a task, and may determine a date at which the task is to be completed based on the quantity of time associated with the task. Additionally, or alternatively, host server 220 may determine a set of project phases, such as a development phase, a testing phase, or the like, and may determine the project schedule based on the set of project phases.

Host server 220 may generate a particular project plan based on one or more elements of the project information, in some implementations. For example, when the project information identifies a particular project complexity associated with the software implementation project, host server 220 may generate the particular project plan based on other project plans associated with other software implementation projects with the particular project complexity. Additionally, or alternatively, host server 220 may perform a pattern analysis, a predictive technique, or the like, on project information associated with other project information to determine one or more aspects of the particular project plan. For example, host server 220 may score other project information associated with another software implementation project based on a similarity to the project information for the software implementation project, and may determine the schedule for the software implementation project based on the schedule for the software implementation project.

Host server 220 may generate a particular project plan based on a project metric, such as a requirements velocity, a requirements volatility, or the like. For example, host server 220 may determine, based on the project information, based on the set of requirements, based on an inflow of requirements, based on an inflow of change requirements, or the like, a projected inflow of requirements (e.g., an inflow of one or more requirements that have yet to be provided for the software implementation project), and may generate a particular project plan based on the projected inflow of requirements. For example, when the projected inflow of requirements indicates that all requirements have been received, host server 220 may generate a schedule with a requirements confirmation task at a first particular time, a development task at a second particular time, and a testing task at a third particular item. Additionally, or alternatively, when the projected inflow of requirements indicates that a threshold portion of the requirements will be received after a threshold period of time, host server 220 may generate another schedule with the requirements confirmation task occurring at time later than the first particular time, a set of development task schedules associated with developing the software implementation project while requirements are still being received, and a testing task schedule associated with testing aspects of the software implementation project while other aspects are still being developed.

Additionally, or alternatively, host server 220 may generate a particular project plan based on a projected change requirements inflow. For example, when host server 220 determines that the projected change requirements inflow will follow a skewed pattern, host server 220 may generate a particular project plan in which multiple change requirements are assessed and implemented together. Additionally, or alternatively, when host server 220 determines that the projected change requirements inflow will follow a straight line pattern, host server 220 may generate another particular project plan in which change requirements are assessed and implemented whenever a particular change requirement is received.

Additionally, or alternatively, host server 220 may generate a particular project plan based on a projected pattern of defects, a projected effort (i.e., a projected quantity of work utilized) for a particular project phase, or the like. For example, host server 220 may determine, based on the projected inflow of requirements and the projected inflow of change requirements, a set of projections regarding a quantity and pattern of defects, effort to correct a set of defects, or the like, and may generate a schedule accounting for the set of projections.

In some implementations, host server 220 may generate a set of project plans based on a set of projections. For example, host server 220 may determine multiple project plans that account for multiple scenarios (e.g., one or more projected requirements inflow patterns, one or more projected change requirements inflow patterns, one or more projected patterns of defect detection, or the like). Additionally, or alternatively, host server 220 may generate one or more project plans based on project advice. For example, host server 220 may recommend (e.g., based on analyzing other software implementation projects) freezing requirements at a particular time in a project plan (e.g., assigning requirements received after the particular time to another version of the software implementation project, rejecting requirements received after the particular time, or the like) to achieve a particular cost savings, a particular effort savings, or the like, and may generate a project plan accounting for implementing the recommendation.

In some implementations, host server 220 may determine a set of scores for the one or more project plans based on a predicted customer satisfaction, a predicted cost, a predicted effort, or the like. In some implementations, host server 220 may determine a set of selection criteria associated with the software implementation project and the one or more project plans and may generate a set of scores for the one or more project plans indicating an extent to which the one or more project plans satisfy the selection criteria. In some implementations, host server 220 may sort the one or more project plans based on the set of scores. In some implementations, host server 220 may provide information identifying the set of scores.

In some implementations, host server 220 may determine a risk associated with the one or more project plans. For example, host server 220 may determine, based on a set of project plans associated with a set of other software implementation projects, a likelihood that a particular schedule of a particular project plan will be disrupted by receiving a change requirement, detecting a defect, or the like, and a cost associated with the disruption. In this case, host server 220 may sort the one or more project plans based on the risk associated with the one or more project plans. Moreover, in some implementations, host server 220 may alter a set of scores associated with the one or more project plans based on the risk associated with the one or more project plans. For example, a particular project plan with a particular score may receive a less desirable score based on a less desirable degree of risk.

In some implementations, host server 220 may select the project plan based on determined project analytics. For example, host server 220 may select a particular project plan with a best score of one or more scores for one or more project plans. Additionally, or alternatively, host server 220 may select a particular project plan with a lowest risk associated therewith compared with a risk associated with other project plans.

In some implementations, host server 220 may provide the one or more project plans to a user for selection. For example, host server 220 may provide information identifying the one or more project plans and the project analytics associated with the one or more project plans to user device 210, and may receive a selection of a particular project plan. Additionally, or alternatively, host server 220 may receive a selection of project advice from the user, and may select a project plan that accounts for implementation of the project advice. For example, host server 220 may provide information indicating that cost overruns are to be expected due to a projected requirements inflow, may provide project advice indicating that requirements should be frozen at a particular time to reduce the cost overruns, and may receive an acceptance of the project advice. In this case, host server 220 may select a project plan that accounts for the project advice being implemented and the requirements being frozen at the particular time.

As further shown in FIG. 4, process 400 may include providing information associated with the generated project plan (block 440). For example, host server 220 may provide information associated with the generated project plan to one or more user devices 210. In some implementations, when host server 220 generates multiple project plans, host server 220 may provide information associated with a selected project plan of the multiple project plans. In some implementations, host server 220 may provide information identifying a set of tasks associated with the selected project plan. For example, host server 220 may identify one or more developers associated with performing a set of tasks, and may provide an indication of the set of tasks to one or more user devices 210 associated with the one or more developers. In some implementations, host server 220 may provide information associated with tracking progress of the project based on the project plan. For example, host server 220 may provide information identifying a projected schedule for the selected plan, a projected requirements inflow associated with the selected project plan, a projected change requirements inflow associated with the selected project plan, or the like.

Although FIG. 4 describes implementations associated with generation of an initial project plan, implementations, described herein, may also relate to generating a modified project plan based on an initial project plan.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of generating an initial project plan for a software implementation project.

Figure 5A:
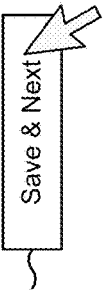

As shown in FIG. 5A, a user interface may be provided to a user for providing project information associated with a software implementation project. The user selects a document file that includes a set of requirements and indicates that the project information is to be populated based on the document file. Host server 220 includes, based on the information in the document file, information identifying a set of requirements, information indicating whether a requirement is critical to the software implementation project, or the like. As shown by reference number 505, based on interaction with a button, a user may indicate that the project information represented by the set of requirements is to be processed by host server 220 to generate a project plan (e.g., an initial project plan) for the software implementation project.

Figure 5B:
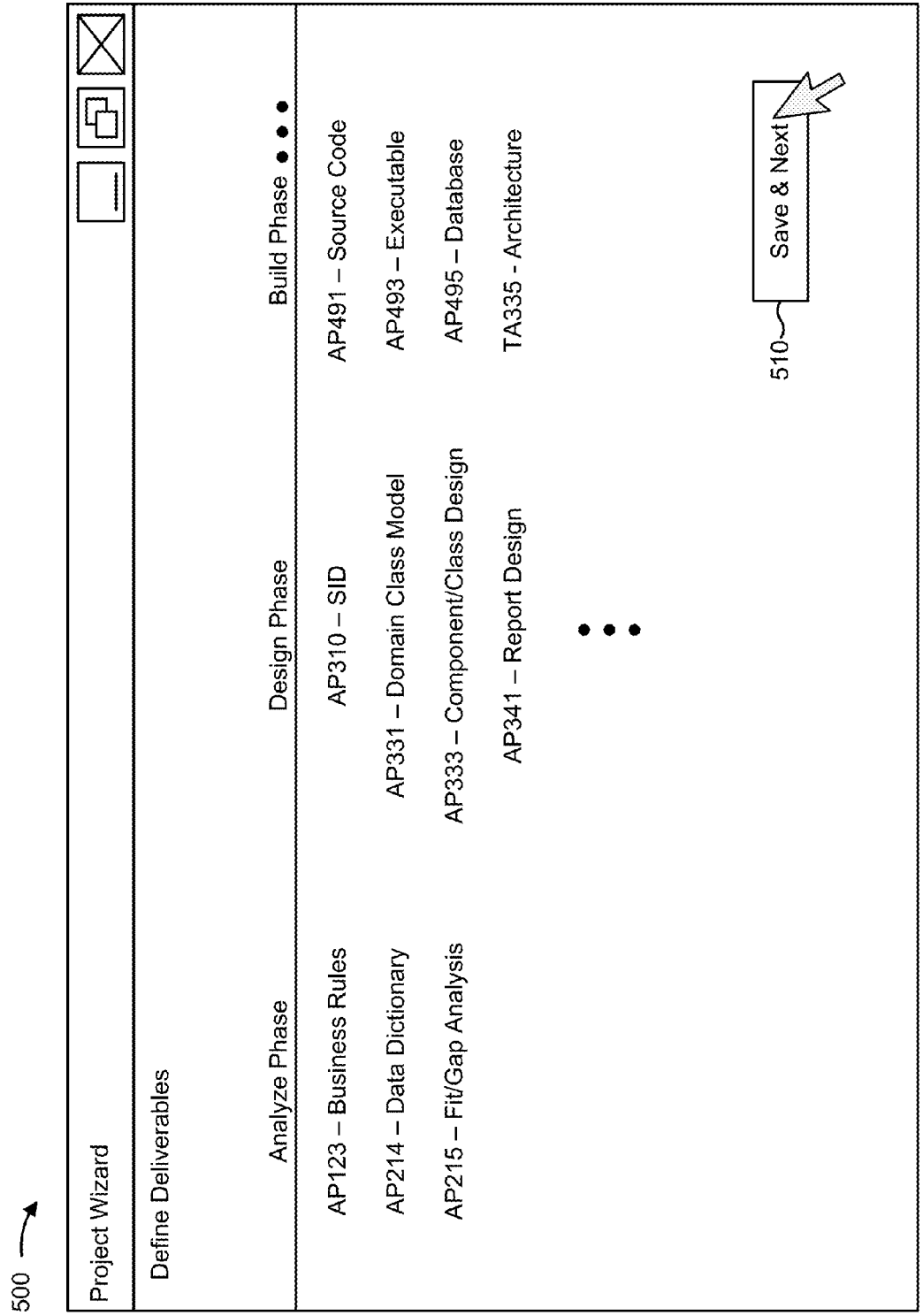

As shown in FIG. 5B, host server 220 defines a set of deliverables for confirmation by a user. Host server 220 may determine, for example, that a particular set of deliverables corresponding to requirements included in the project information are to be generated for a set of project phases (e.g., an analyze phase, a design phase, a build phase, or the like). As shown by reference number 510, based on user interaction with a button, the user confirms that the generated deliverables correspond to the requirements. In an alternative example, the user may alter the generated deliverables to add a deliverable, remove a deliverable, or the like.

Figure 5C:
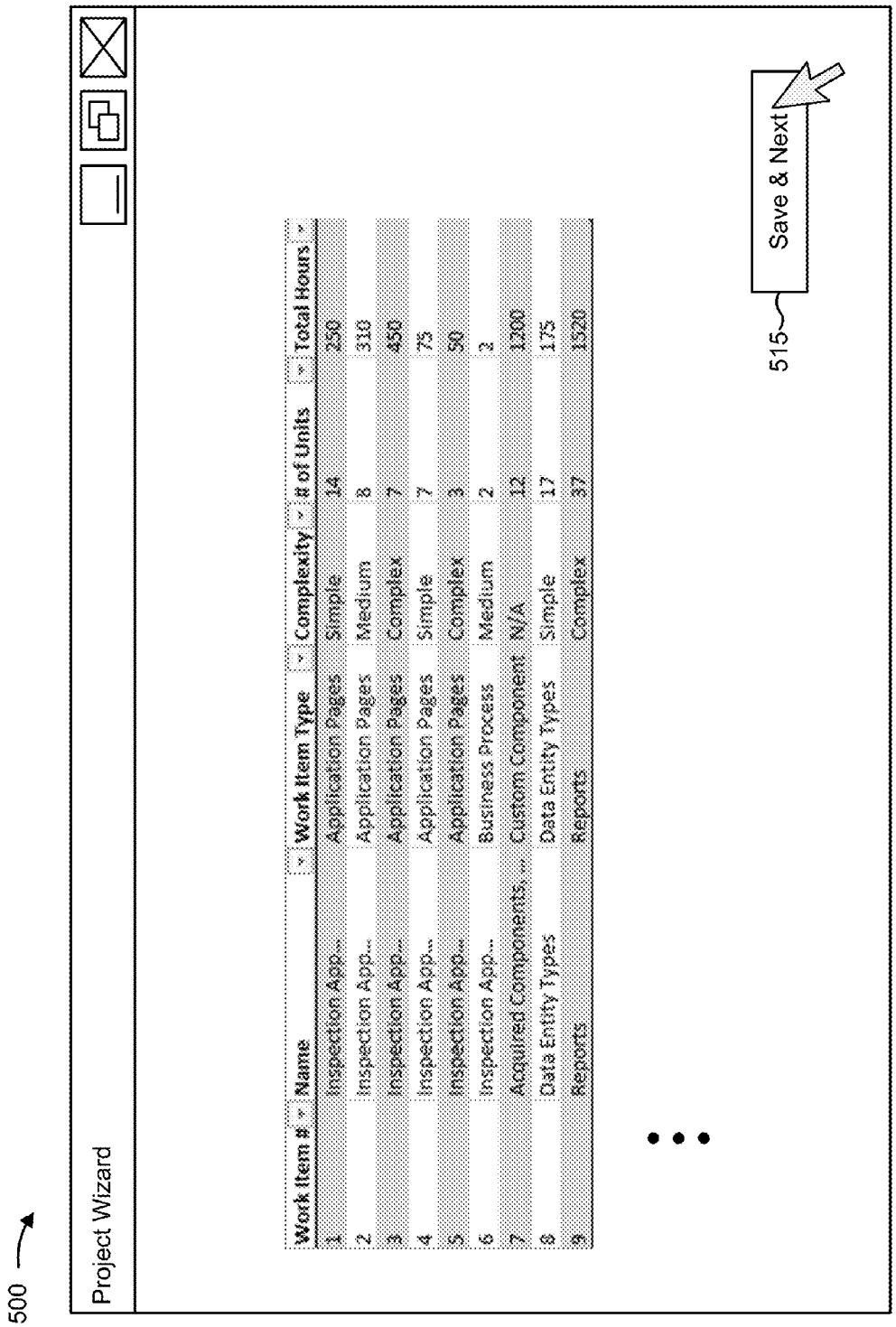

As shown in FIG. 5C, host server 220 provides a user interface associated with performing estimation relating to portions of the software implementation project. For example, the user may estimate a complexity of a set of tasks (e.g., "Work Items"), a work item type, a quantity of units of each work item, and a quantity of time that is required to complete each work item. In some implementations, host server 220 may generate some or all of the information associated with performing estimation. Additionally, or alternatively, a user may provide some or all of the information associated with performing estimation via the user interface. As shown by reference number 515, based on user interaction with a button, the user confirms the information associated with performing estimation relating to task complexity.

As shown in FIG. 5D, host server 220 generates a project plan, of a set of project plans, for the software implementation project. Host server 220 identifies a set of tasks for generating the deliverables, a duration for the set of tasks, an effort for the set of tasks (e.g., in hours, days, or the like), or the like. Host server 220 provides an indication of relational mapping of requirements and deliverables, such as an indication of a particular set of requirements associated with a task, a particular set of deliverables associated with the task, or the like. As shown by reference number 520, based on user interaction with a button, host server 220 provides project analytics regarding a set of project plans.

Figure 5E:
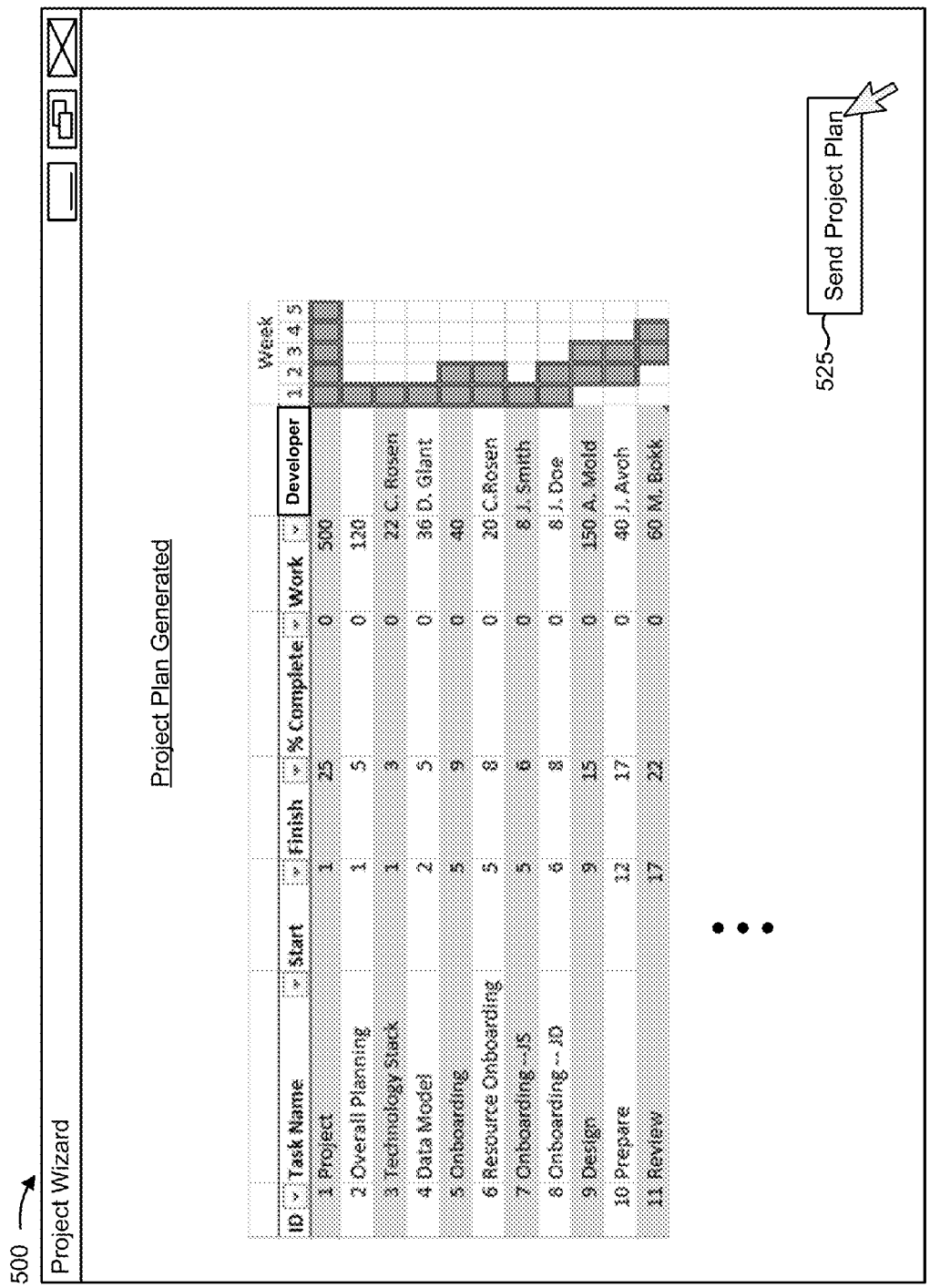

As shown in FIG. 5E, host server 220 provides information associated with a project plan generated based on the information provided and/or confirmed by the user. For example, host server 220 provides information identifying tasks, a schedule associated with the tasks, a percentage completion of each task, a quantity of work associated with each task, and a developer assigned to perform each task. As shown by reference number 525, based on user interaction with a button, the user may indicate that host server 220 is to send information relating to the project plan to one or more other users, such as a set of developers, a set of managers, a set of customers, or the like.

As indicated above, FIGS. 5A-5E are provided merely as an example. Other examples are possible and may differ from what was described with regard to FIGS. 5A-5E.

Figure 6:
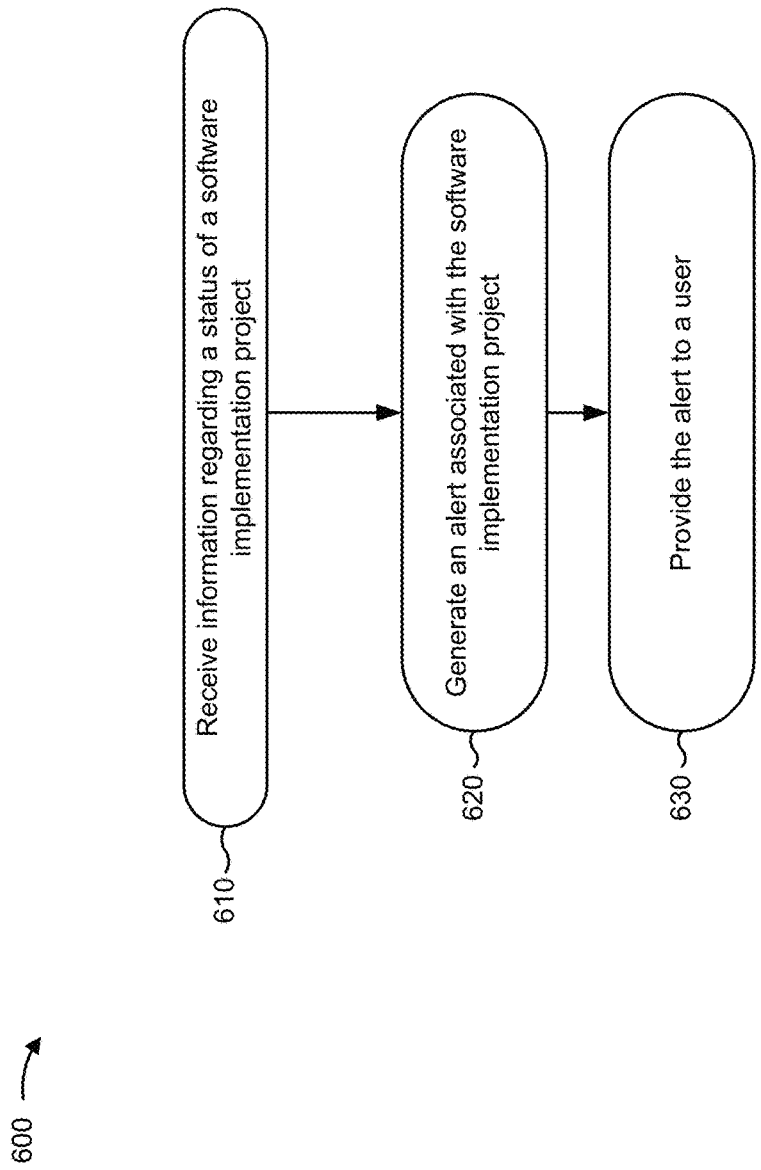
FIG. 6 is a flow chart of an example process for providing an alert associated with a software implementation project.

FIG. 6 is a flow chart of an example process 600 for providing an alert associated with a software implementation project. In some implementations, one or more process blocks of FIG. 6 may be performed by host server 220. In some implementations, one or more process blocks of FIG. 6 may be performed by another device or a group of devices separate from or including host server 220, such as user device 210, or the like.

As shown in FIG. 6, process 600 may include receiving information regarding a status of a software implementation project (block 610). For example, host server 220 may monitor development of the software implementation project to receive information regarding the status of the software implementation project. The status may refer to information associated with a schedule of a project plan for the software implementation project, a budget of the project plan, a quantity of defects detected for the project plan, or the like. In some implementations, host server 220 may receive information regarding the status of the software implementation project from a user. For example, a user may update a progress of one or more tasks associated with a project plan for the software implementation project. Additionally, or alternatively, host server 220 may determine the status based on tracking code generation, tracking testing modules, or the like.

In some implementations, host server 220 may determine the status based on comparing received information to information associated with the project plan, such as established linkages, dependencies, planned thresholds (relating to development goals), or the like, to determine whether a portion of the software implementation project is on schedule. For example, when a first task is delayed, host server 220 may determine whether the delay will prevent developers from performing a second task. Additionally, or alternatively, host server 220 may determine that a quantity of defects detected in a first deliverable affects a second deliverable.

As further shown in FIG. 6, process 600 may include generating an alert associated with the software implementation project (block 620). For example, host server 220 may generate the alert associated with the software implementation project. An alert may include information identifying a criticality of the alert, a set of action items (e.g., information regarding a cause of the alert, such as a delay, a cost overrun, or the like), a set of suggested actions (e.g., information suggesting actions that may mitigate a delay, mitigate a cost overrun, or the like, such as suggesting that a new project plan be generated), information associated with tasks, requirements, deliverables, available developers, etc. implicated by the alert, or the like. In some implementations, host server 220 may generate a software impact assessment providing a high level description of how a status of the software implementation project will affect the software implementation project.

In some implementations, host server 220 may generate the alert based on a metric associated with the status of the software implementation project satisfying a threshold. For example, host server 220 may determine that an alteration to a project metric satisfies a threshold, and may generate an alert to inform a user of the alteration. A project metric may refer to a velocity of requirements, a volatility of requirements, a schedule, a projected cost, a projected effort, a quantity of requirements affected by a change requirement, or the like. For example, host server 220 may determine, based on monitoring requirements, change requirements, or the like, that a requirements velocity has deviated a threshold percentage from a projected quantity. As another example, host server 220 may determine that a projected delay to a task affects a threshold quantity of other tasks based on a relational mapping associated with the requirements, deliverables, and tasks. Additionally, or alternatively, host server 220 may determine that a project effort will be increased a threshold quantity, a project cost will increase a threshold quantity, or the like based on a projected delay.

As further shown in FIG. 6, process 600 may include providing the alert to a user (block 630). For example, host server 220 may provide the alert to the user. In some implementations, host server 220 may provide the alert to the user when a trigger is satisfied. For example, host server 220 may provide the alert based on determining that a threshold delay has occurred, a threshold cost overrun is projected, or the like. In some implementations, host server 220 may provide information associated with suggesting a response to the alert by the user, such as information indicating that a project plan can be altered to account for a delay, information indicating that developers can be re-assigned from a first task to a second task to reduce a delay, or the like. In some implementations, host server 220 may provide traceability information when alerting the user, such as information indicating requirements, deliverables, available developers, tasks, or the like that are related to the alert.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
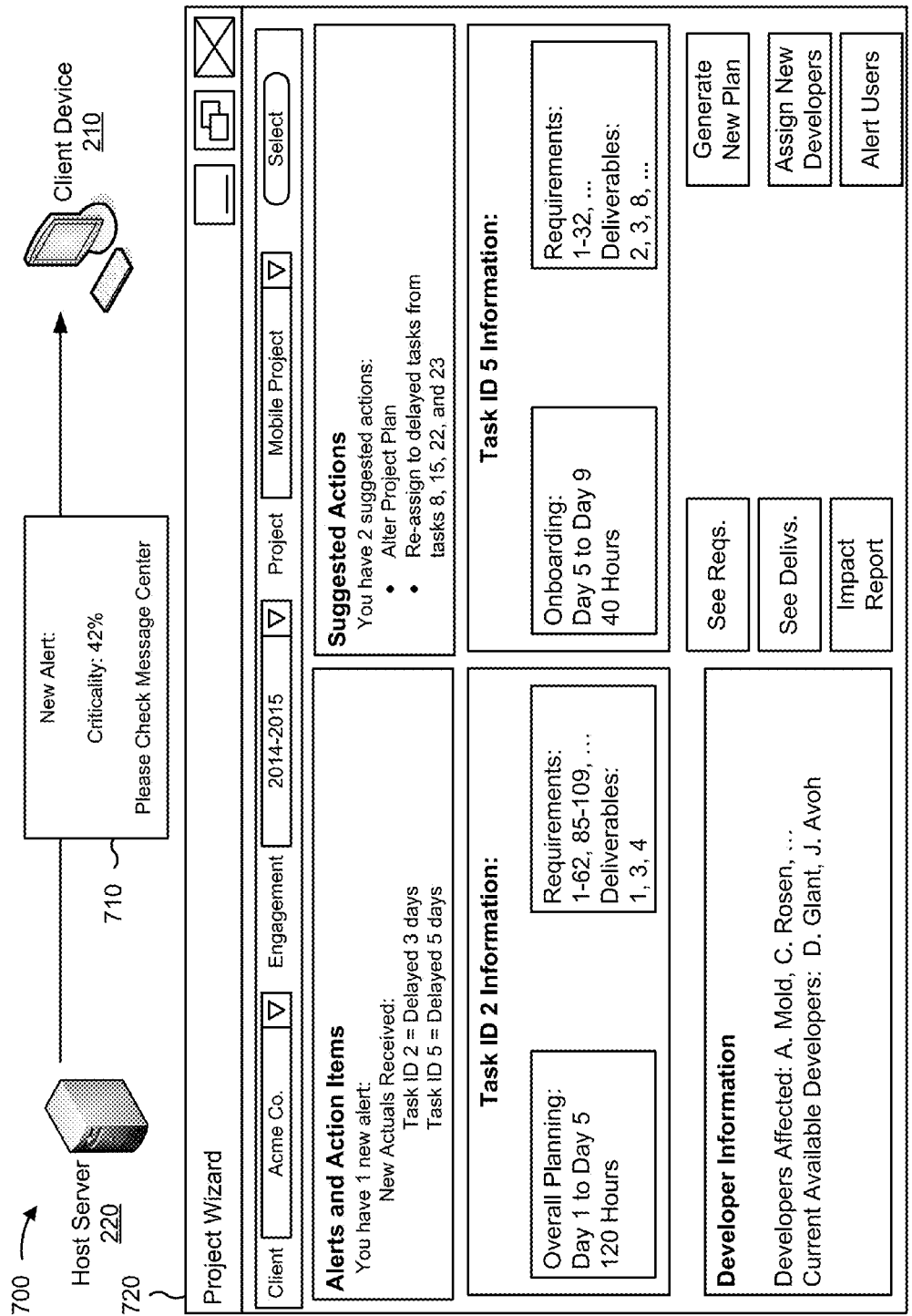
FIG. 7 is a diagram of an example implementation relating to the example process shown in FIG. 6.

FIG. 7 is a diagram of an example implementation 700 relating to example process 600 shown in FIG. 6. FIG. 7 shows an example of providing an alert associated with a software implementation project.

As shown in FIG. 7, and by reference number 710, host server 220 may provide an alert to client device 210 based on generating an alert associated with a status of a software implementation project. The alert indicates a criticality of the alert (e.g., associated with a quantity of delay that triggered the alert). The alert indicates that a "message center" includes information regarding the alert. As shown by reference number 720, based on the user accessing the message center, detailed information regarding the alert is provided for review by the user.

As further shown in FIG. 7, the detailed information includes information identifying alerts and action items that indicates that new actuals (i.e., information indicating progress on a task by a developer) have been received indicating that two tasks are delayed. The detailed information includes information identifying the two tasks that are delayed, such as information identifying requirements associated with the two tasks and deliverables associated with the two tasks (e.g., determined based on relational mapping performed when generating a project plan).

As further shown in FIG. 7, the detailed information includes information identifying developers affected by the delay and available developers. The detailed information includes suggested actions determined based on analyzing the requirements, the deliverables, and the available developers, such as altering the project plan (e.g., generating a modified project plan, as described herein with regard to FIG. 8) and re-assigning developers to the two delayed tasks from other tasks. The user may select from a set of buttons provided via the message center that provide further information regarding requirements, deliverables, delay impact, an option to generate a new project plan, an option to re-assign developers, and an option to "alert users" (e.g., to alert other users regarding the two delayed tasks).

As indicated above, FIG. 7 is provided merely as an example. Other examples are possible and may differ from what was described with regard to FIG. 7.

Figure 8:
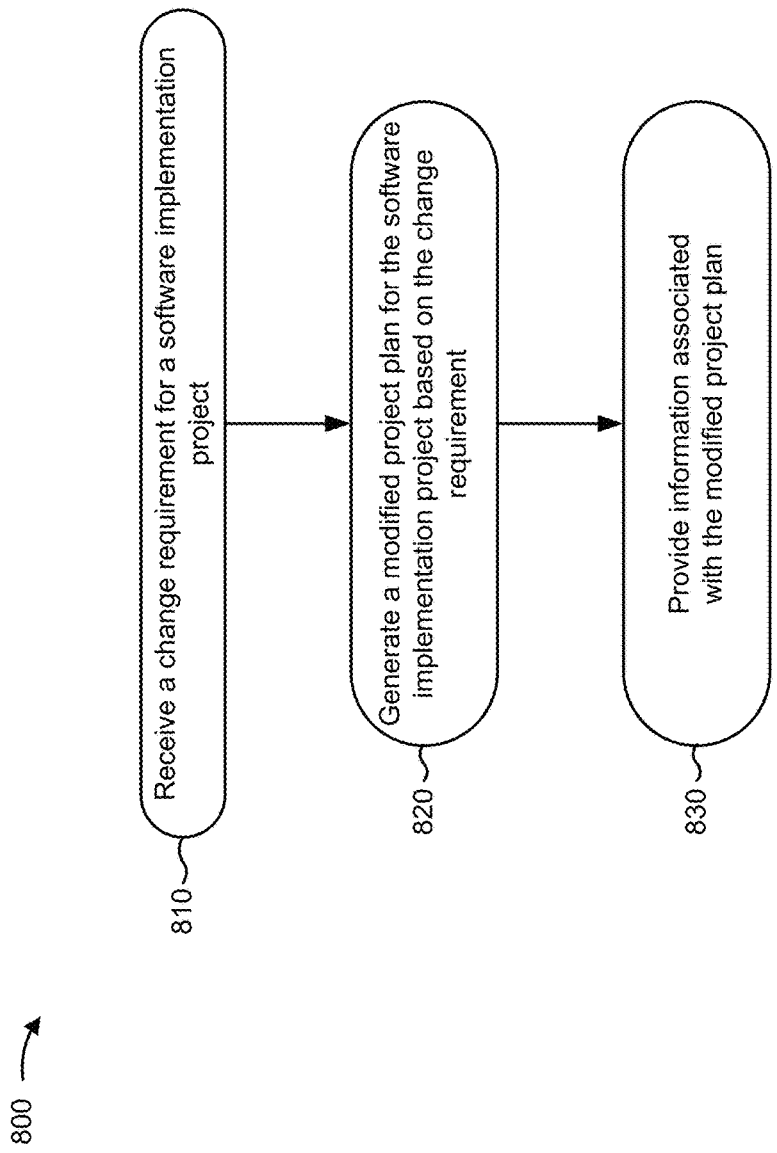
FIG. 8 is a flow chart of an example process for modifying a project plan based on receiving a change requirement.

FIG. 8 is a flow chart of an example process 800 for modifying a project plan based on receiving a change requirement. In some implementations, one or more process blocks of FIG. 8 may be performed by host server 220. In some implementations, one or more process blocks of FIG. 8 may be performed by another device or a group of devices separate from or including host server 220, such as user device 210, or the like.

As shown in FIG. 8, process 800 may include receiving a change requirement for a software implementation project (block 810). For example, host server 220 may receive a change requirement for a software implementation project. A change requirement may refer to a requirement received during completion of a software implementation project that alters one or more requirements of the software implementation project. In some implementations, host server 220 may receive the change requirement based on providing a user interface for the user to input the change requirement. Additionally, or alternatively, host server 220 may receive the change requirement based on receiving information and processing the information to determine a change requirement. For example, host server 220 may receive a document associated with a particular format and may parse the document to determine that a change requirement is included therein. In some implementations, host server 220 may provide a user with an option to reject a change requirement. For example, when a change requirement is received, host server 220 may provide an alert to a user, as described herein with regard to FIG. 6, and the user may select to implement the change requirement, reject the change requirement, delay implementation of the change requirement, modify the change requirement, or the like. In some implementations, host server 220 may determine a phase of the project associated with the change requirement. For example, at a first phase of the project a change requirement associated with a first quantity of additional work may be included and at a second phase of the project the change requirement may be excluded from incorporation.

As further shown in FIG. 8, process 800 may include generating a modified project plan based on the change requirement (block 820). For example, host server 220 may generate the modified project plan that includes a modified set of tasks, a modified schedule, a modified cost project, a modified assignment of tasks to developers, or the like.

In some implementations, host server 220 may utilize updated projections to generate a modified project plan that accounts for the updated projections. For example, when a project metric changes and a user determines to modify the project plan based on the project metric changing, host server 220 may utilize the updated project metric in determining a new schedule, a new developer assignment, or the like. In some implementations, host server 220 may determine a criticality of an aspect of the software implementation project when generating the modified project plan. For example, host server 220 may determine one or more aspects of the software implementation project (e.g., one or more deliverables, one or more tasks, or the like) affected by a change requirement, may determine respective criticality scores for the one or more aspects, and may generate a modified project plan based on the criticality scores.

In some implementations, host server 220 may generate another schedule for the software implementation project based on the alteration to the project plan. For example, when host server 220 determines that the software implementation project is to be delayed by the change requirement, host server 220 may generate a particular schedule that incorporates the delay to the software implementation project and may provide an alert to a user regarding the delay as described herein with regard to FIG. 6. Additionally, or alternatively, host server 220 may generate another schedule that reduces a delay caused by a change requirement by increasing the quantity of developers working on tasks concurrently, performing testing earlier in a development phase, or the like.

In some implementations, host server 220 may generate another set of tasks for the modified project plan. For example, when host server 220 determines that additional testing, as compared with the project plan, is to be performed based on the change requirement, host server 220 may generate another set of tasks associated with incorporating the additional testing into the modified project plan.

In some implementations, host server 220 may generate a particular modified project plan that does not incorporate a received change requirement. For example, when host server 220 receives a change requirement that host server 220 determines will affect a threshold quantity of requirements, host server 220 may generate a particular modified project plan that rejects the change requirement for a particular release version of the software implementation project and incorporates the change requirement into another release version of the software implementation project. In some implementations, host server 220 may reject the change requirement based on information provided by a user regarding rejecting change requirements. In this way, host server 220 may assist a user in managing incoming requirements and/or change requirements that may affect a project plan.

In some implementations, host server 220 may generate a set of modified project plans. For example, host server 220 may generate a project plan based on optimizing a project schedule, optimizing a project quality, optimizing a project defect detection, or the like. In some implementations, host server 220 may determine a score for one or more project plans of the set of modified project plans, and may select a particular project plan for implementation, may provide information for user selection of the particular project plan, or the like, as described herein with regard to FIG. 4.

As further shown in FIG. 8, process 800 may include providing information associated with the modified project plan (block 830). For example, host server 220 may provide information associated with the modified project plan. In some implementations, host server 220 may provide information identifying one or more aspects of the modified project plan, such as providing a modified schedule to one or more developers, a modified set of cost projections, or the like. In some implementations, host server 220 may provide traceability information associated with the modified project plan. For example, host server 220 may provide information identifying requirements affected by change requirements, deliverables projected to be affected by an altered velocity of requirements, or the like.

In some implementations, host server 220 may provide information identifying the modified project plan, and may receive a rejection of the modified project plan. For example, when a change requirement has been received, host server 220 may determine that a threshold change to a project schedule will occur, may provide information identifying a modified project plan with a modified project schedule, and the user may indicate that host server 220 is to reject the change requirement and maintain the project plan. Additionally, or alternatively, host server 220 may provide information identifying requirements, critical requirements, deliverables, or the like that are affected by the change to the project metric and/or the modified project plan associated therewith. For example, host server 220 may provide information identifying relational mapping between requirements, deliverables, and tasks of the modified project plan. In this way, host server 220 may provide, to a user managing the software implementation project, information associated with managing the software implementation project, thereby facilitating increased project efficiency, reduced project cost, reduced project effort, improved project error detection, and/or improved customer satisfaction. Furthermore, host server 220 may realize a reduction in processing necessary to complete the software implementation project as a result of improved project management.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIGS. 9A-9E are diagrams of an example implementation 900 relating to example process 800 shown in FIG. 8. FIGS. 9A-9E show an example of modifying a project plan based on determining that a project metric has altered.

Figure 9A:
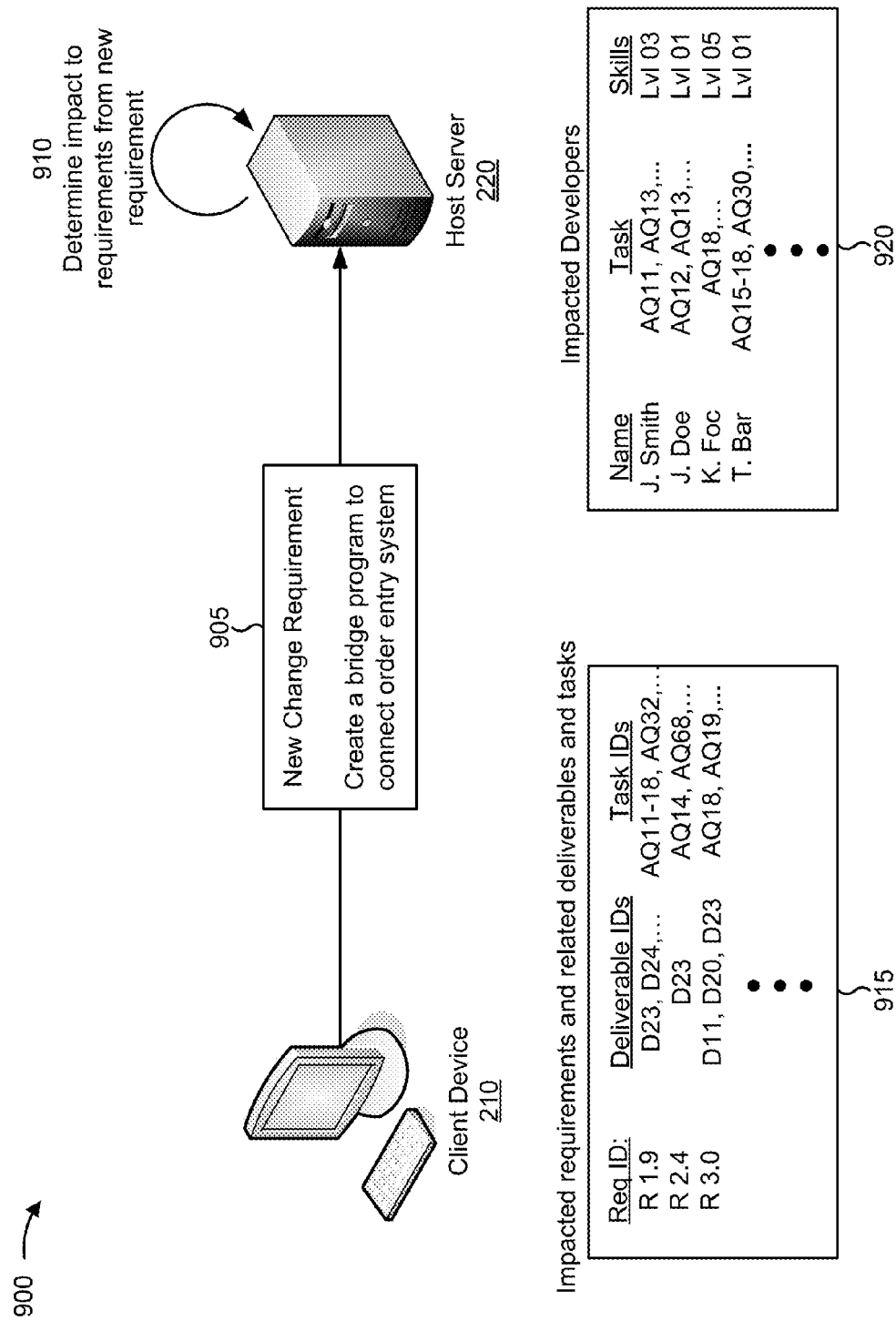
FIGS. 9A-9E are diagrams of an example implementation relating to the example process shown in FIG. 8.

As shown in FIG. 9A, and by reference number 905, host server 220 receives a new change requirement for an ongoing software implementation project. As shown by reference number 910, host server 220 may determine an impact to a set of requirements for the software implementation project based on the new requirement. As shown by reference number 915, host server 220 utilizes relational mapping between requirements, deliverables, and tasks to determine requirements, deliverables, and tasks affected by the new requirement. As shown by reference number 920, host server 220 determines a set of developers associated with tasks affected by the new requirement.

Figure 9B:
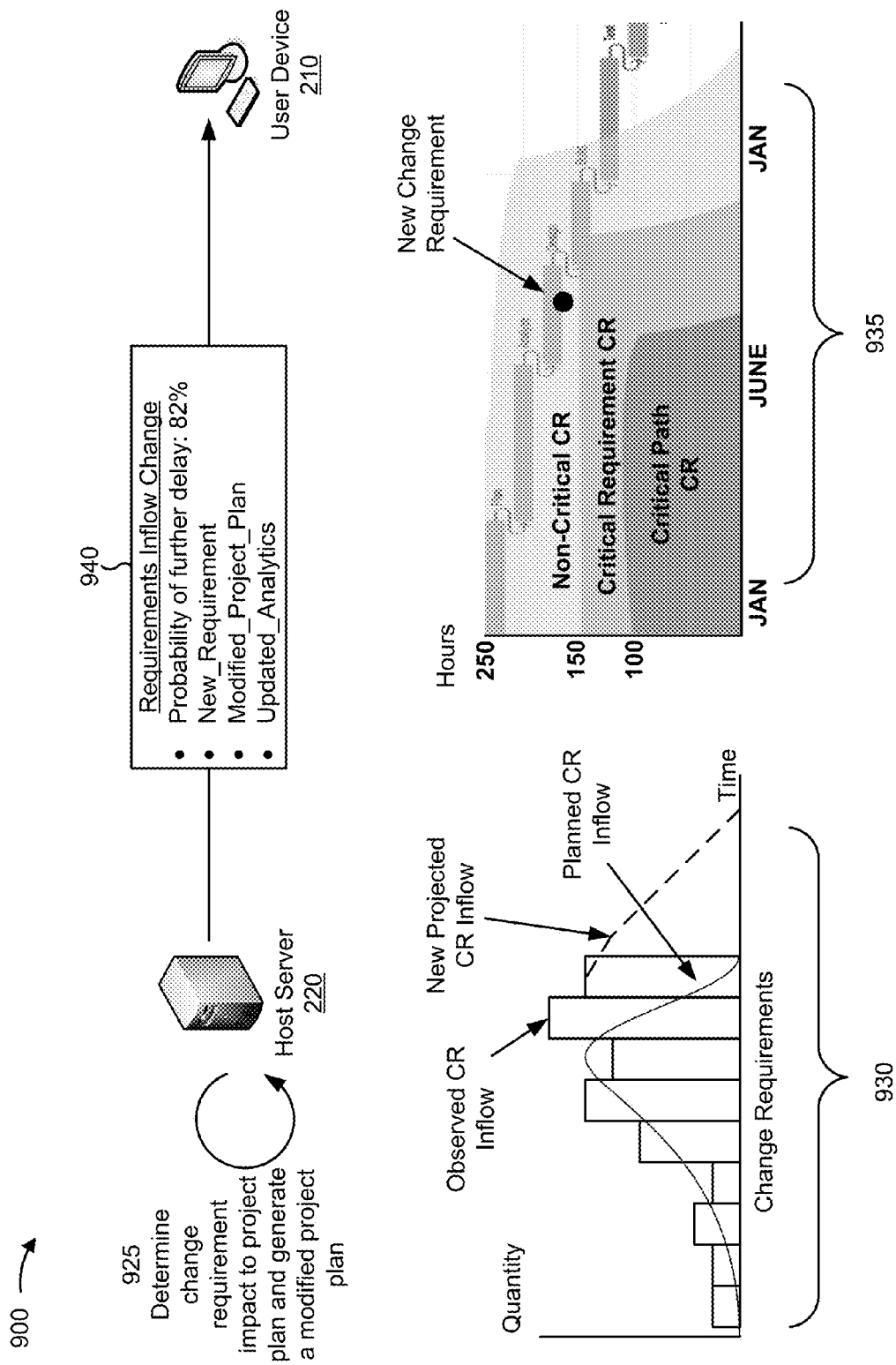

As shown in FIG. 9B, and by reference number 925, host server 220 determines an impact to requirements based on the change requirement and determines to generate a modified project plan. For example, as shown by reference number 930, host server 220 determines that the new projected change requirements inflow will result in change requirements arriving at a later time than a planned change requirements inflow. As shown by reference number 935, host server 220 determines a phase of the project at which the change requirement has arrived and whether the software implementation project can incorporate the change requirement based on the phase of the project. Assume that the change requirement is a non-critical change requirement associated with 175 hours of work that has been received during the design phase. Assume that host server 220 generates a modified project plan to incorporate the change requirement into the software implementation project. As shown by reference number 940, host server 220 provides an indication of a probability of delay as a result of the change, a set of new requirements, a modified project plan, and a set of project analytics associated with the modified project plan to user device 210.

Figure 9C:
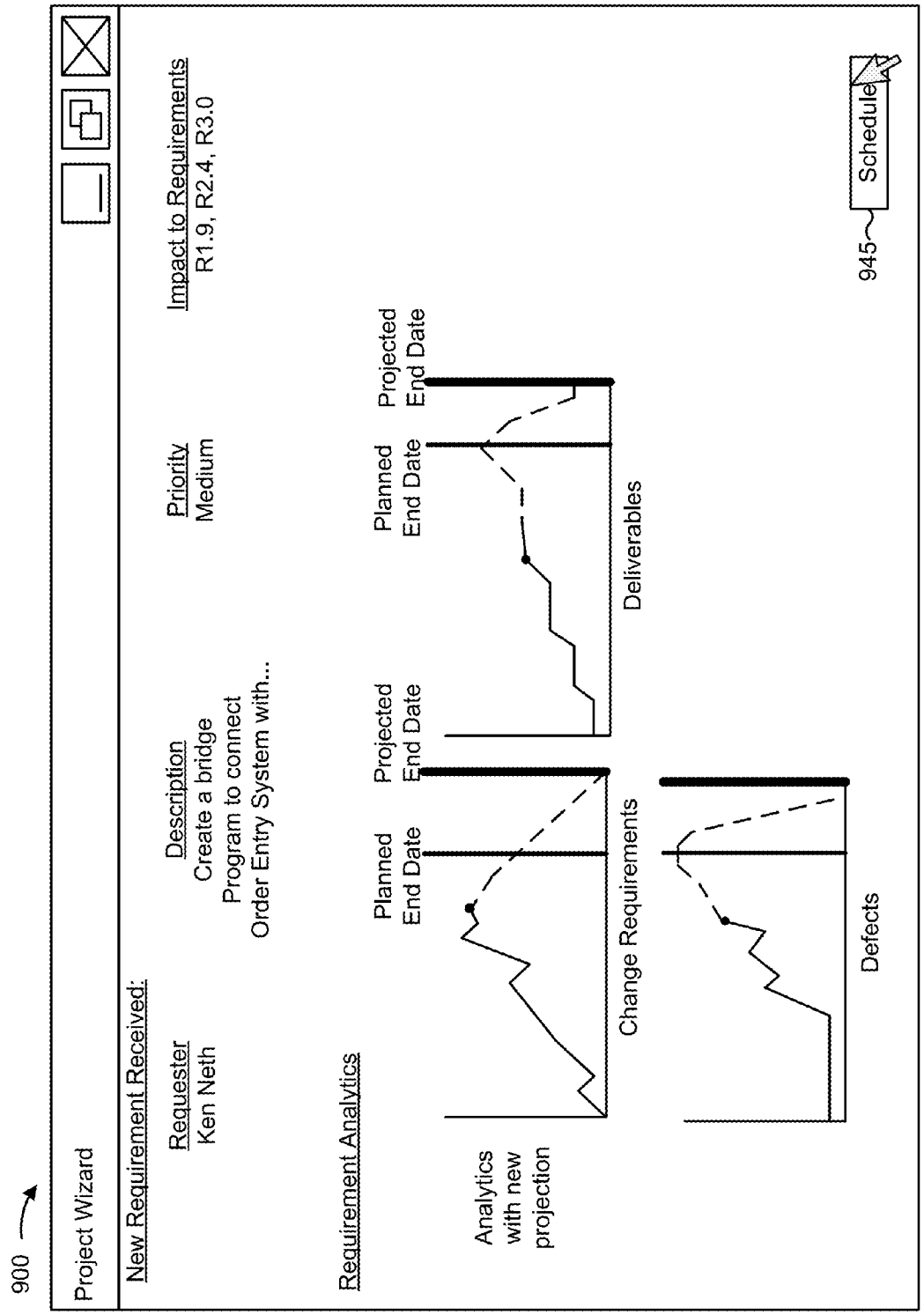

As shown in FIG. 9C, a user interface provides, to a user, information associated with the modified project plan and the change requirement. For example, host server 220 may provide, for display via user device 210, information identifying affected requirements, information identifying new projections, based on the modified project plan, for receipt of change requirements, completion of deliverables, and detection of defects based on observed information. As shown by reference number 945, based on user interaction with a button, the user requests that host server 220 provide information identifying a schedule associated with the modified plan.

Figure 9D:
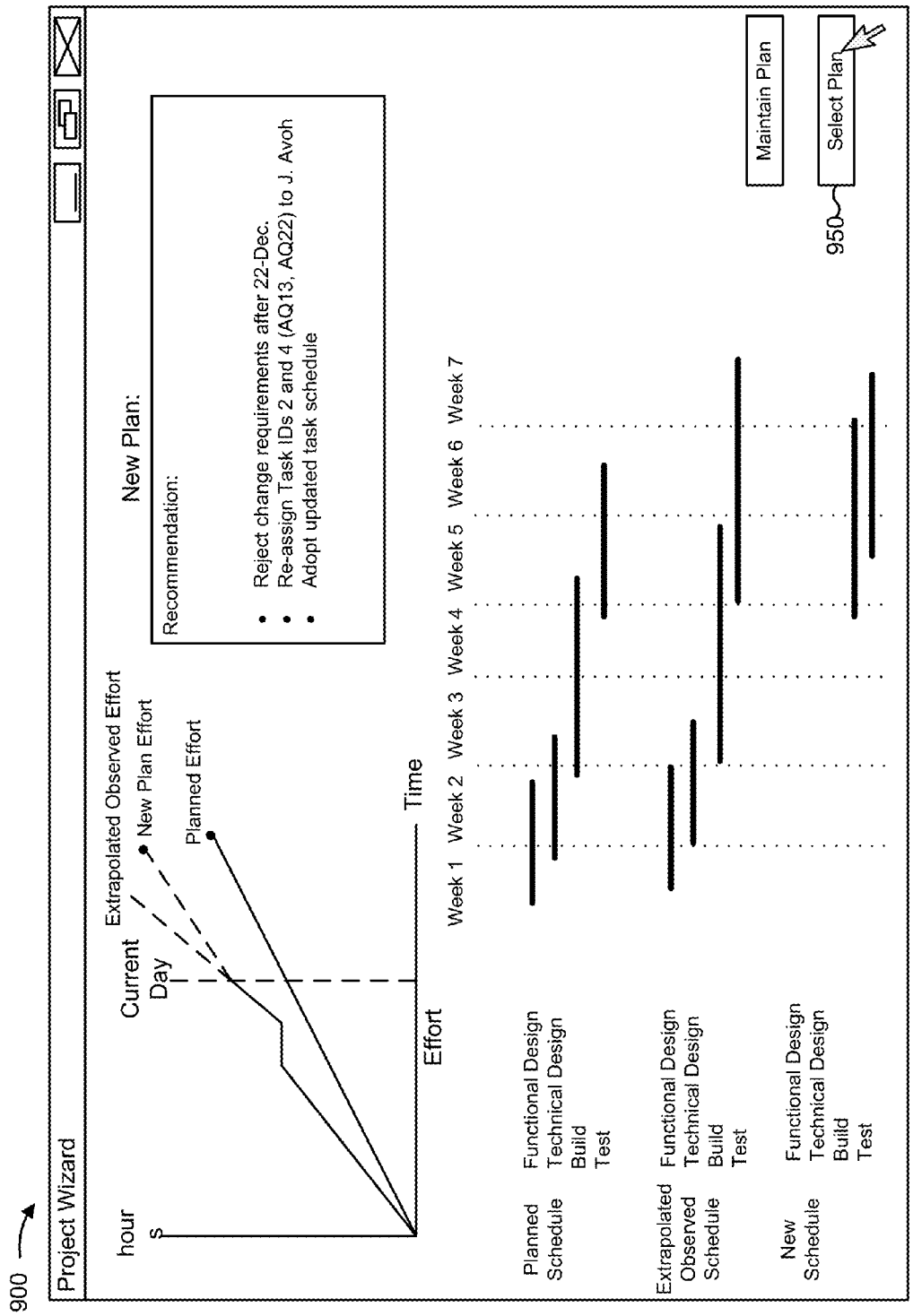

As shown in FIG. 9D, host server 220 provides, for display via user device 210, information identifying a planned schedule for an initial project plan, an extrapolated schedule for the initial project plan based on the observed information and the new change requirement, and a new schedule based on the modified project plan. Host server 220 identifies an effort for the planned schedule, the extrapolated schedule, and the new schedule. Host server 220 identifies project advice for the modified project plan (e.g., that the user reject change requirements after a particular date, re-assign a set of tasks to a different developer (e.g., a different developer), and adopt the new schedule. As shown by reference number 950, based on user interaction with a button, the user may select the modified project plan, and host server 220 may provide information associated with the modified project plan (e.g., the new schedule for the modified project plan, a new set of tasks for the modified project plan, or the like). In another example, the user may reject the modified project plan, and may indicate that the project plan is to be maintained.

Figure 9E:
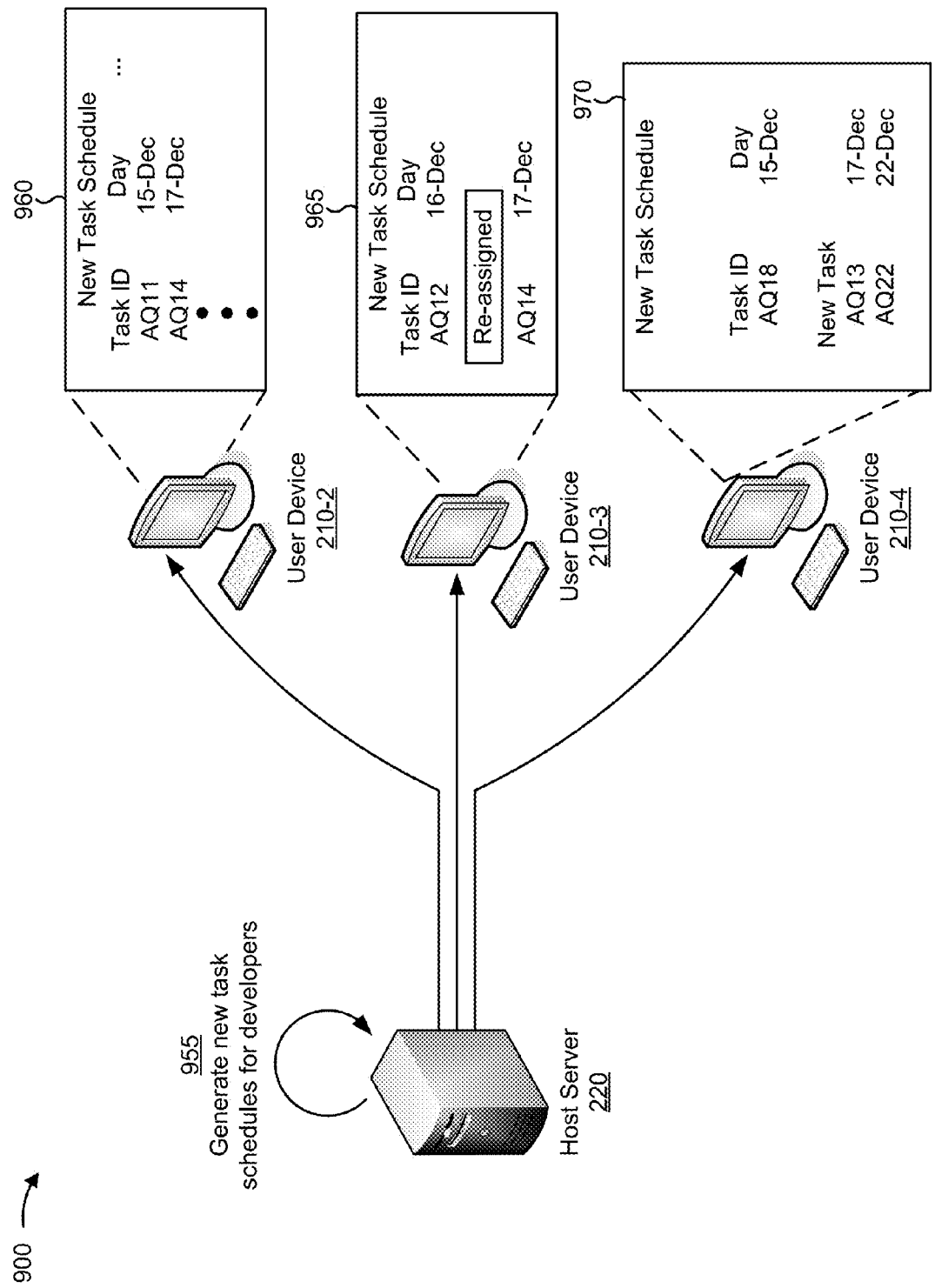

As shown in FIG. 9E, and by reference number 955, based on receiving the user selection of the modified project plan, host server 220 generates a new set of task schedules for developers of the software implementation project. As shown by reference number 960, host server 220 provides a first task schedule to user device 210-2 for utilization by a first user. As shown by reference number 965, host server 220 provides a second task schedule to user device 210-3 that indicates that a particular task for a second user has been re-assigned to another user. As shown by reference number 970, host server 220 provides a third task schedule to user device 210-4 indicating that a new task has been assigned to a third user. Assume that host server 220 determines the task schedules for the modified project plan based on skills associated with each developer and task complexity for each task as described herein with regard to FIG. 10.

As indicated above, FIGS. 9A-9E are provided merely as an example. Other examples are possible and may differ from what was described with regard to FIGS. 9A-9E.

Figure 10:
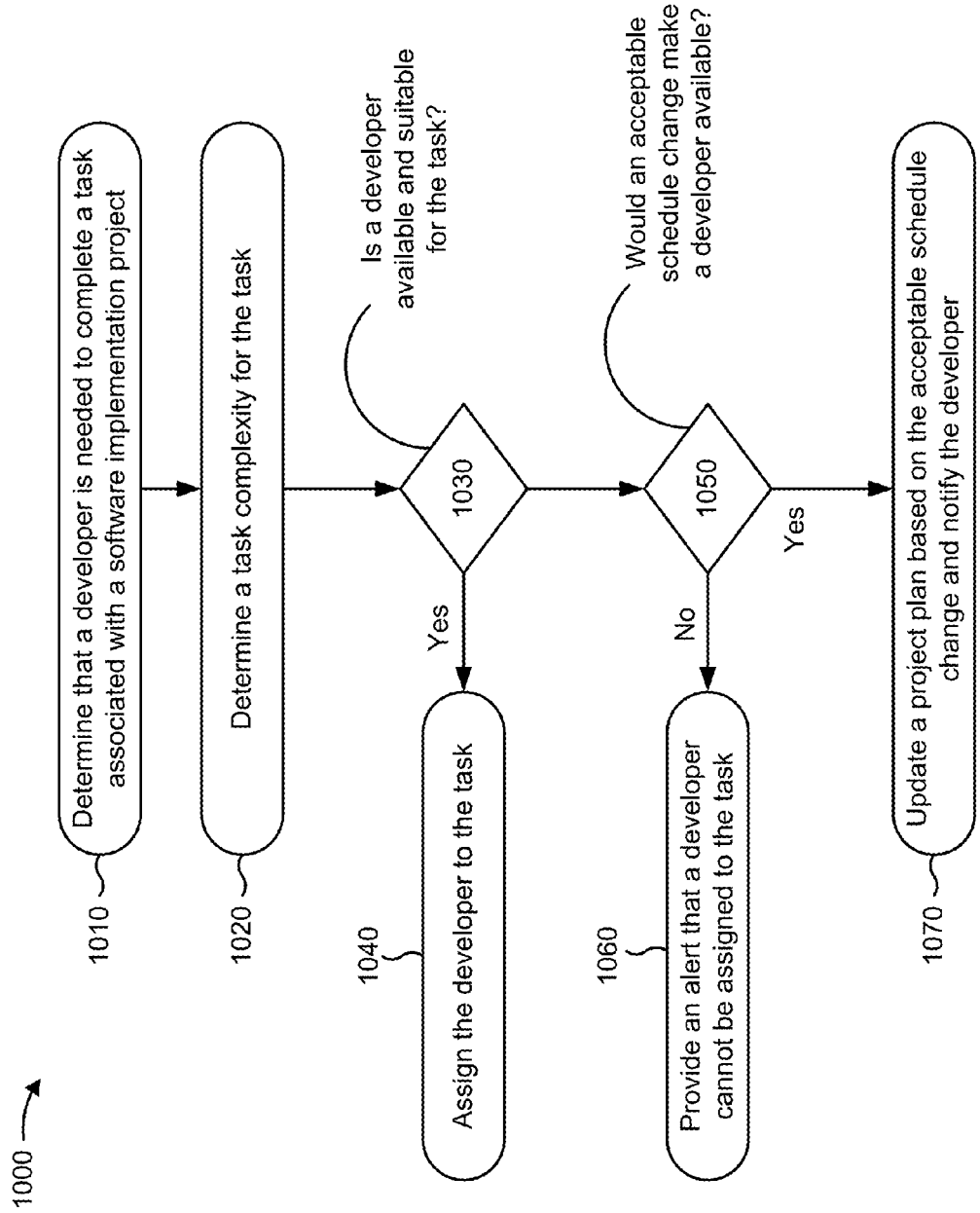
FIG. 10 is a flow chart of an example process for assigning a developer to perform a task associated with a software implementation project.

FIG. 10 is a flow chart of an example process 1000 for assigning a developer to perform a task associated with a software implementation project. In some implementations, one or more process blocks of FIG. 10 may be performed by host server 220. In some implementations, one or more process blocks of FIG. 10 may be performed by another device or a group of devices separate from or including host server 220, such as user device 210, or the like.

As shown in FIG. 10, process 1000 may include determining that a developer is needed to complete a task associated with a software implementation project (block 1010). For example host server 220 may determine that the developer is needed to complete the task associated with the software implementation project. In some implementations, host server 220 may determine that a developer is needed based on a task being generated for a project plan (e.g., an initial project plan, a modified project plan, or the like). Additionally, or alternatively, host server 220 may determine that a developer is needed based on another developer being re-assigned, removed, or the like from the task.

As further shown in FIG. 10, process 1000 may include determining a task complexity for the task (block 1020). For example, host server 220 may determine the task complexity for the task. In some implementations, the task complexity may correspond to a set of skills for a developer that may be required to complete the task. In some implementations, host server 220 may determine the task complexity based on a user indication, based on stored information regarding one or more similar tasks, or the like.

As further shown in FIG. 10, process 1000 may include determining whether a developer is available and suitable for the task (block 1030). For example, host server 220 may determine whether a developer, of a set of developers, may be assigned to the task. In some implementations, host server 220 may determine that a particular developer is suitable for the task based on the developer being associated with a set of skills corresponding to the complexity of the task. In some implementations, host server 220 may determine a set of skills for a developer based on a data structure classifying developers according to respective sets of skills. In some implementations, host server 220 may determine that the particular developer is available based on a scheduled time for performing the task corresponding to available time in a schedule of the developer.

As further shown in FIG. 10, process 1000 may include determining that a developer is available and suitable for the task (block 1030—YES) and assigning the developer to the task (block 1040). For example, host server 220 may determine that the developer is available and suitable for the task and may assign the developer to the task. In some implementations, host server 220 may update a project plan to reflect the developer being assigned to the task. Additionally, or alternatively, host server 220 may provide information to a supervisor, to the developer, or the like indicating that the developer is assigned to the task.

As further shown in FIG. 10, process 1000 may include determining that a developer is not available and suitable for the task (block 1030—NO) and determining whether an acceptable schedule change would make a developer available (block 1050). For example, host server 220 may determine that the set of developers does not include a developer that is available and suitable for the task. In this case, host server 220 may determine whether an acceptable schedule change would make a suitable developer available. In some implementations, host server 220 may determine an acceptable schedule change based on receiving information from a user indicating a set of acceptable schedule changes. Additionally, or alternatively, host server 220 may determine an acceptable schedule change based on the project plan, based on altering aspects of the project plan without satisfying a threshold alteration, based on stored information associated with changing the schedule, or the like.

As further shown in FIG. 10, process 1000 may include determining that there is not an acceptable schedule change that would make a developer available (block 1050—NO) and providing an alert that a developer cannot be assigned to the task (block 1060). For example, host server 220 may determine that there is not an acceptable schedule change that would make the developer available and providing an alert that a developer cannot be assigned to the task. In some implementations, host server 220 may receive information from a user indicating additional developers that may be suitable for performing the task (e.g., by lowering a skill set requirement for the task, etc.), and host server 220 attempt to assign the task to a developer again.

As further shown in FIG. 10, process 1000 may include determining that an acceptable schedule change would make the developer available (block 1050—YES) and updating a project plan based on the acceptable schedule change and notifying the developer (block 1070). For example, host server 220 may determine that an acceptable schedule change would make the developer available, may update the project plan based on the acceptable schedule change, and may notify the developer. In some implementations, host server 220 may identify a set of users, a set of developers, etc. that are affected by updating the project plan and may provide alerts regarding updating the project plan. In some implementations, host server 220 may provide information identifying the task, access to the task, or the like to the developer to facilitate the developer performing the task.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

In this way, a host server may provide information associated with managing a software implementation project and incorporating new requirements, change requirements, or the like. Furthermore, the host server may determine a modified project plan based on determining that a project metric associated with a project plan has altered beyond a threshold level, thereby improving the technical field of project management and improving project efficiency, reducing costs, reducing delays, reducing processing power, or the like for a particular software implementation project.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memory devices; and
   one or more processors, connected to the one or more memory devices, configured to:
      determine configuration information including information identifying:
         a type of the device on which a user interface is displayed,
         one or more capabilities of the device, and
         one or more specifications associated with the device;
      configure, based on the configuration information, a user interface to provide a first graphical user interface for receiving project information for a software implementation project,
         the project information including:
            a set of requirements defining the software implementation project,
            a set of deliverables describing results of the software implementation project,
            a project delivery method to be used in connection with the software implementation project, and
            a complexity of the software implementation project,
               the complexity including a required set of skills for a developer for the software implementation project;
      compare the software implementation project and a set of other software implementation projects that have been successfully completed;
      generate additional project information based on comparing the software implementation project and the set of other software implementation projects;
      determine a first relational mapping of elements of the project information and the additional project information;
      generate a set of initial project plans based on the first relational mapping,
         a particular initial project plan, of the set of initial project plans, being generated based on other project plans, associated with the set of other software implementation projects, including the complexity;
      configure, based on the configuration information, the user interface to provide a second graphical user interface for implementing at least one of the set of initial project plans;
      implement the particular initial project plan after receiving a user selection of the particular initial project plan,
         the particular initial project plan including a project schedule;
      receive status information regarding the particular initial project plan during fulfillment of the particular initial project plan;
      selectively provide, using the status information regarding the particular initial project plan and for display on a particular portion of a third graphical user interface, one or more alerts, the third graphical user interface being configured based on the configuration information,
the one or more alerts including information indicating a set of mitigating actions,
a first alert, of the one or more alerts, being provided when one or more requirements metrics satisfies a threshold,
the first alert indicating a criticality of the first alert, and
the threshold including at least one of:
a threshold delay, or
a threshold cost overrun, and
a second alert, of the one or more alerts, being provided when:
a set of available developers does not include a developer with a skill set requirement to perform a task, and
a change to the project schedule would not make a developer, with the skill set requirement to perform the task, available;
receive, after selectively providing the second alert, information indicating additional developers would be suitable if the skill set requirement, to perform the task, is lowered to a lower skill set requirement;
receive a document associated with a particular format;
parse the document to determine a change requirement for the software implementation project included in the document;
utilize a second relational mapping to determine one or more requirements of the set of requirements, one or more deliverables of the set of deliverables, and one or more tasks of a set of tasks affected by the change requirement;
generate a set of modified project plans based on utilizing the second relational mapping and after receiving the information indicating the additional developers would be suitable if the skill set requirement, to perform the task, is lowered to the lower skill set requirement;
configure, based on the configuration information, the user interface to provide a fourth graphical user interface for implementing at least one of the set of modified project plans;
implement a particular modified project plan, of the set of modified project plans, after receiving a user selection of the particular modified project plan,
the particular modified project plan being different from the particular initial project plan, and
the particular modified project plan including the lower skill set requirement;
generate a set of task schedules for the additional developers based on implementing the particular modified project plan;
send, via a network, the set of task schedules to one or more user devices associated with the additional developers,
each task schedule, of the set of task schedules, being sent to a corresponding user device of the one or more user devices based on:
skills associated with each of the additional developers, and
a task complexity for each task of the set of task schedules; and
provide, for display via the network and to another user device, an indication of a probability of delay as a result of implementing the change requirement and the particular modified project plan.

2. The device of claim 1, where the particular modified project plan is a first modified project plan; and
where the one or more processors are further configured to:
determine a set of scores for the set of modified project plans based on the one or more requirements metrics;
select a second particular modified project plan based on the set of scores; and
provide information identifying the second particular modified project plan based on selecting the second particular modified project plan.

3. The device of claim 1, where the task is a first task;
where the one or more processors are further configured to:
receive information regarding progress of a second task associated with the particular initial project plan;
determine that the second task is behind a scheduled progress associated with the second task; and
compare the progress of the second task with the threshold delay; and
where the one or more processors, when selectively providing the one or more alerts, are to:
selectively provide the first alert based on determining that the progress of the second task meets the threshold delay,
the first alert including information identifying one or more deliverables, of the set of deliverables, associated with the second task.

4. The device of claim 1, where the one or more processors are further configured to:
determine the second relational mapping,
the second relational mapping being between the set of requirements and the set of deliverables; and
provide traceability information associated with the second relational mapping,
the traceability information indicating one or more deliverables, of the set of deliverables, affected by a change to a particular requirement, of the set of requirements.

5. The device of claim 1, where the one or more processors, are further configured to:
determine a projected change requirements inflow pattern for the software implementation project based on the project information and other project information associated with other software implementation projects; and
determine an impact to the software implementation project associated with the information regarding the particular initial project plan based on the projected change requirements inflow pattern; and
where the one or more processors, when generating the particular modified project plan, are further to:
generate the particular modified project plan based on the impact to the software implementation project.

6. The device of claim 1, where the set of tasks is a first set of tasks; and
where the one or more processors are further configured to:
determine a second set of tasks associated with the set of requirements and the set of deliverables;
identify one or more developers to whom to assign one or more tasks of the second set of tasks,
the one or more developers being determined based on at least one of a task complexity, a developer skill, or a developer availability; and provide information associated with assigning the one or more tasks, of the second set of tasks, to the one or more developers.

7. The device of claim 1, where the one or more processors, when generating the particular modified project plan, are configured to:
   generate a modified project schedule associated with the particular modified project plan; and
   where the one or more processors are further configured to:
      provide information identifying the particular modified project plan based on generating the modified project schedule.

8. A computer-readable medium storing instructions, the instructions comprising:
   one or more instructions that, when executed by one or more processors, cause the one or more processors to:
      determine configuration information including information identifying:
         a type of device on which a user interface is displayed,
         one or more capabilities of the device, and
         one or more specifications associated with the device;
      configure, based on the configuration information, a user interface to provide a first graphical user interface for project information regarding one or more requirements for a software implementation project, the project information including:
         a project delivery method to be used in connection with the software implementation project, and
         a complexity of the software implementation project,
            the complexity including a required set of skills for a developer for the software implementation project;
      compare the software implementation project and a set of other software implementation projects that have been successfully completed;
      generate additional project information based on comparing the software implementation project and the set of other software implementation projects;
      determine a first relational mapping of elements of the project information and the additional project information;
      generate a set of initial project plans based on the first relational mapping,
         a particular initial project plan, of the set of initial project plans, being generated based on other project plans, associated with the set of other software implementation projects, including the complexity;
      configure, based on the configuration information, the user interface to provide a second graphical user interface for implementing at least one of the set of initial project plans;
      implement the particular initial project plan after receiving a user selection of the particular initial project plan,
         the particular initial project plan including a project schedule;
      determine a set of tasks associated with a respective set of task complexities,
         the set of tasks being associated with producing a set of deliverables based on a set of requirements;
      determine the project schedule based on the set of tasks and the respective set of task complexities, the project schedule including respective timeframes for the set of tasks;
      selectively provide, for display on a particular portion of a third graphical user interface, one or more alerts indicating a status of the software implementation project after receiving the project information,
         the third graphical user interface being configured based on the configuration information,
         the one or more alerts including information indicating a set of mitigating actions,
            a first alert, of the one or more alerts, being provided when one or more requirements metrics satisfies a threshold,
               the first alert indicating a criticality of the first alert, and
               the threshold including at least one of:
                  a threshold delay, or
                  a threshold cost overrun, and
            a second alert, of the one or more alerts, being provided when:
               a set of available developers does not include a developer with a skill set requirement to perform a task of the set of tasks, and
               a change to the project schedule would not make a developer, with the skill set requirement to perform the task, available;
      receive, after selectively providing the second alert, information indicating additional developers would be suitable if the skill set requirement, to perform the task, is lowered to a lower skill set requirement;
      receive a document associated with a particular format;
      parse the document to determine a change requirement for the software implementation project included in the document;
      utilize a second relational mapping to determine one or more requirements of the set of requirements, one or more deliverables of the set of deliverables, and one or more tasks of the set of tasks affected by the change requirement;
      provide, based on utilizing the second relational mapping, a set of updated project plans, including the project schedule and the lower skill set requirement, for the software implementation project after receiving the information indicating the additional developers would be suitable if the skill set requirement, to perform the task, is lowered to the lower skill set requirement;
      configure, based on the configuration information, the user interface to provide a fourth graphical user interface for implementing at least one of the set of updated project plans;
      implement a particular updated project plan, of the set of updated project plans, after receiving a user selection of the particular updated project plan;
      generate a set of task schedules for the additional developers based on implementing the particular updated project plan;
      send, via a network, the set of task schedules to one or more user devices associated with the additional developers,
         each task schedule, of the set of task schedules, being sent to a corresponding user device of the one or more user devices based on:
            skills associated with each of the additional developers, and
            a task complexity for each task of the set of task schedules; and provide, for display via the network and to another user device, an indication of a probability of delay as a result of implementing the change requirement and the particular updated project plan.

9. The computer-readable medium of claim 8, where the one or more instructions, when executed by the one or more processors, further cause the one or more processors to:
monitor completion of the set of tasks for the software implementation project; and
provide alert information associated with monitoring task completion of the set of tasks.

10. The computer-readable medium of claim 8, where the task is a first task of the set of tasks;
where the one or more instructions, when executed by the one or more processors, further cause the one or more processors to:
determine that a second task, of the set of tasks, has not been performed during a time-frame allotted to the second task in the project schedule based on monitoring completion of the set of tasks;
determine another project schedule for the software implementation project based on determining that the second task has not been performed during the time-frame allotted to the second task in the project schedule; and
provide information associated with the other project schedule.

11. The computer-readable medium of claim 8, where the one or more instructions, when executed by the one or more processors, further cause the one or more processors to:
determine a complexity of the task;
selectively assign the developer, with the skill set requirement, to perform the task based on the complexity of the task; and
selectively modify the project schedule to facilitate assigning the developer to perform the task.

12. The computer-readable medium of claim 8, where the one or more instructions, when executed by the one or more processors, further cause the one or more processors to:
determine the one or more requirements, of the set of requirements, that correspond to the change requirement;
determine the one or more deliverables, of the set of deliverables, that correspond to the change requirement;
determine the one or more tasks, of the set of tasks, that correspond to the change requirement;
generate another set of tasks based on the change requirement,
the other set of tasks being associated with generating another set of deliverables based on the one or more requirements that correspond to the change requirement;
determine another project schedule based on the other set of tasks; and
provide information associated with the other project schedule.

13. The computer-readable medium of claim 8, where the task is a first task of the set of tasks; and
where the one or more instructions, when executed by the one or more processors, further cause the one or more processors to:
identify a second task of the set of tasks,
completion of the second task requiring a particular user availability and a particular user skill competency;
identify a user,
the user being associated with the particular user availability and the particular user skill competency; and
provide information associated with assigning completion of the second task to the user.

14. The computer-readable medium of claim 8, where the one or more instructions, when executed by the one or more processors, further cause the one or more processors to:
receive information accepting the project schedule based on providing information identifying the project schedule;
determine respective users associated with performing the set of tasks; and
provide information assigning the set of tasks to the respective users.

15. A method, comprising:
determining, by a device, configuration information including information identifying:
a type of the device on which a user interface is displayed,
one or more capabilities of the device, and
one or more specifications associated with the device;
configuring, by the device and based on the configuration information, a user interface to provide a first graphical user interface for receiving project information for a software implementation project,
the project information including:
a project delivery method to be used in connection with the software implementation project, and
a complexity of the software implementation project,
the complexity including a required set of skills for a developer for the software implementation project;
comparing, by the device, the software implementation project and a set of other software implementation projects that have been successfully completed;
generating, by the device, additional project information based on comparing the software implementation project and the set of other software implementation projects;
determining, by the device, a first relational mapping of elements of the project information and the additional project information;
determining, by the device, a projected requirements velocity and a projected requirements volatility based on the project information and other project information associated with one or more other software implementation projects,
the projected requirements velocity representing a timing of requirements inflow, and
the projected requirements volatility representing a rate of change of requirements associated with receiving one or more change requirements;
generating, by the device, a set of initial project plans for the software implementation project based on the first relational mapping,
a particular initial project plan, of the set of initial project plans, being generated based on other project plans, associated with the set of other software implementation projects, including the complexity;
configuring, by the device and based on the configuration information, the user interface to provide a second graphical user interface for implementing at least one of the set of initial project plans;
selecting, by the device, the particular initial project plan based on a set of project criteria, the particular initial project plan including a project schedule for a set of project tasks,
the set of project tasks representing work product for producing a set of deliverables describing results of the software implementation project;
implementing, by the device, the particular initial project plan based on a selection of the particular initial project plan;
providing, by the device and for display on a particular portion of a third graphical user interface, one or more alerts indicating a status of the particular initial project plan based on the projected requirements velocity and the projected requirements volatility,
the third graphical user interface being configured based on the configuration information,
the one or more alerts including information indicating a set of mitigating actions,
a first alert, of the one or more alerts, indicating a criticality of the one or more alerts, and
the first alert being provided when a trigger is satisfied,
the trigger including at least one of:
a threshold delay, or
a threshold cost overrun, and
a second alert, of the one or more alerts, being provided when:
a set of available developers does not include a developer with a skill set requirement to perform a task of the set of project tasks, and
a change to the project schedule would not make a developer, with the skill set requirement to perform the task, available;
receiving, by the device and after providing the second alert, information indicating additional developers would be suitable if the skill set requirement, to perform the task, is lowered to a lower skill set requirement;
receiving, by the device, a document associated with a particular format;
parsing, by the device, the document to determine a change requirement for the software implementation project included in the document;
utilizing, by the device, a second relational mapping to determine one or more requirements of a set of requirements, one or more deliverables of a set of deliverables, and one or more tasks of the set of project tasks affected by the change requirement;
generating, by the device and based on utilizing the second relational mapping, a set of updated project plans,
the set of updated project plans including the lower skill set requirement to perform the task after receiving the information indicating the additional developers would be suitable if the skill set requirement, to perform the task, is lowered to the lower skill set requirement;
configuring, by the device and based on the configuration information, the user interface to provide a fourth graphical user interface for implementing at least one of the set of updated project plans;
implementing, by the device, a particular updated project plan, of the set of updated project plans, after receiving a user selection of the particular updated project plan;
generating, by the device, a set of task schedules for the additional developers based on implementing the particular updated project plan;

sending, by the device via a network, the set of task schedules to one or more user devices associated with the additional developers,
each task schedule, of the set of task schedules, being sent to a corresponding user device of the one or more user devices based on:
skills associated with each of the additional developers, and
a task complexity for each task of the set of task schedules; and
providing, by the device, for display via the network, and to another user device, an indication of a probability of delay as a result of implementing the change requirement and the particular updated project plan.

16. The method of claim 15, further comprising:
comparing the project information to other project information associated with another software implementation project,
the other software implementation project being associated with a particular requirements velocity and a particular requirements volatility; and
where determining the projected requirements velocity and the projected requirements volatility comprises:
determining the projected requirements velocity and the projected requirements volatility based on the particular requirements velocity and the particular requirements volatility.

17. The method of claim 15, further comprising:
determining respective scores for the set of initial project plans based on the set of project criteria; and
where selecting the particular initial project plan comprises:
selecting the particular initial project plan based on the respective scores for the set of initial project plans.

18. The method of claim 15, further comprising:
determining the one or more requirements that are affected by the change requirement; and
providing information identifying the one or more requirements that are affected by the change requirement.

19. The method of claim 15, further comprising:
determining one or more aspects of the software implementation project affected by the change requirement;
determining respective criticality scores for the one or more aspects of the software implementation project affected by the change requirement;
determining another project plan for the software implementation project based on the respective criticality scores for the one or more aspects of the software implementation project affected by the change requirement,
the other project plan including another project schedule associated with altering the one or more aspects of the software implementation project affected by the change requirement; and
providing information associated with the other project plan.

20. The method of claim 15, further comprising:
receiving information identifying the status,
the status relating to the project schedule; and
determining a criticality value associated with the status,
the criticality value relating to a phase of the project associated with the projected requirements velocity and the projected requirements volatility; and
where providing the one or more alerts comprises:

providing the first alert based on the criticality value associated with the status.

\* \* \* \* \*

UNITED STATES PATENT AND TRADEMARK OFFICE
CERTIFICATE OF CORRECTION

PATENT NO. : 10,198,702 B2  
APPLICATION NO. : 14/610284  
DATED : February 5, 2019  
INVENTOR(S) : Purnima Jagannathan et al.

Page 1 of 1

It is certified that error appears in the above-identified patent and that said Letters Patent is hereby corrected as shown below:

On the Title Page

Item (73) Assignee, change "Acccenture Global Services Limited, Dublin (IE)" to -- Accenture Global Services Limited, Dublin (IE) --

Signed and Sealed this  
Twenty-fifth Day of February, 2020

Andrei Iancu  
*Director of the United States Patent and Trademark Office*